(12) United States Patent
Tsukagoshi et al.

(10) Patent No.: US 8,659,645 B2
(45) Date of Patent: Feb. 25, 2014

(54) SYSTEM, APPARATUS, AND METHOD FOR IMAGE DISPLAY AND MEDICAL IMAGE DIAGNOSIS APPARATUS

(75) Inventors: Shinsuke Tsukagoshi, Nasushiobara (JP); Kazumasa Arakita, Nasushiobara (JP); Takumi Hara, Akishima (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 13/553,046

(22) Filed: Jul. 19, 2012

(65) Prior Publication Data

US 2013/0182084 A1 Jul. 18, 2013

(30) Foreign Application Priority Data

Jul. 19, 2011 (JP) .................. 2011-158029

(51) Int. Cl.
*H04N 13/04* (2006.01)
(52) U.S. Cl.
USPC ............................................................ 348/51
(58) Field of Classification Search
USPC ............................................................ 348/51
See application file for complete search history.

(56) References Cited

FOREIGN PATENT DOCUMENTS

| JP | 6-149967 A | 5/1994 |
|---|---|---|
| JP | 7-236164 A | 9/1995 |
| JP | 10-74267 A | 3/1998 |
| JP | 2002-49004 A | 2/2002 |
| JP | 2004-297607 A | 10/2004 |
| JP | 2004-357789 A | 12/2004 |
| JP | 2005-86414 | 3/2005 |
| JP | 2005-111080 A | 4/2005 |
| JP | 2005-164916 A | 6/2005 |
| JP | 2006-115151 A | 4/2006 |
| JP | 2006-276277 A | 10/2006 |
| JP | 2007-316993 A | 12/2007 |
| JP | 2009-519488 A | 5/2009 |
| JP | 2009-528565 A | 8/2009 |
| JP | 2010-107685 A | 5/2010 |
| JP | 2010-108203 A | 5/2010 |
| JP | 2011-104186 A | 6/2011 |
| WO | WO 2007/069131 A2 | 6/2007 |
| WO | WO 2007/099488 A1 | 9/2007 |

OTHER PUBLICATIONS

Office Action issued Nov. 20, 2012 in Japanese Patent Application No. 2011-158029 (with English-language translation).
Japanese Office Action issued Mar. 5, 2013 in Patent Application No. 2011-158029 with English Translation.

*Primary Examiner* — Mehrdad Dastouri
*Assistant Examiner* — Kristin Dobbs
(74) *Attorney, Agent, or Firm* — Oblon, Spivak, McClelland, Maier & Neustadt, L.L.P.

(57) ABSTRACT

An image display system according to an embodiment includes a controlling apparatus and a display apparatus. The controlling apparatus includes a judging unit and a switching control unit, whereas the display apparatus includes a switching unit. Based on information related to viewing of an image, the judging unit judges whether the image to be displayed by the display apparatus is an image for a stereoscopic view or an image for a planar view. The switching control unit exercises control so as to switch the display apparatus into a stereoscopic view mode or a planar view mode, according to a judgment result of the judging unit. The switching unit switches the display apparatus into the stereoscopic view mode or the planar view mode, according to the control of the switching control unit.

8 Claims, 13 Drawing Sheets

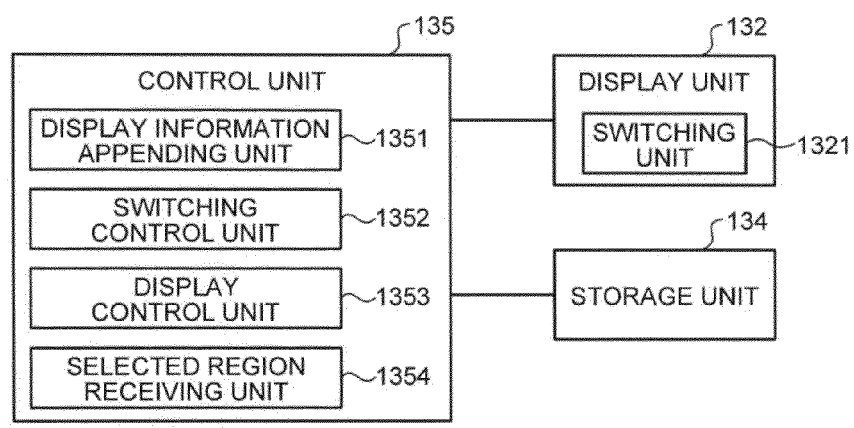
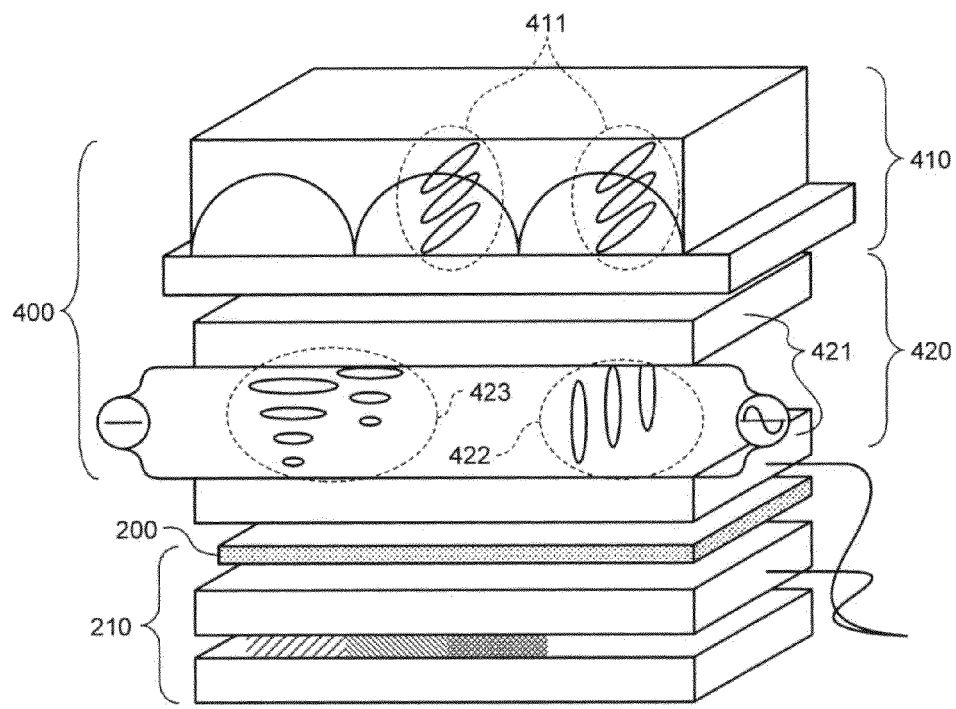

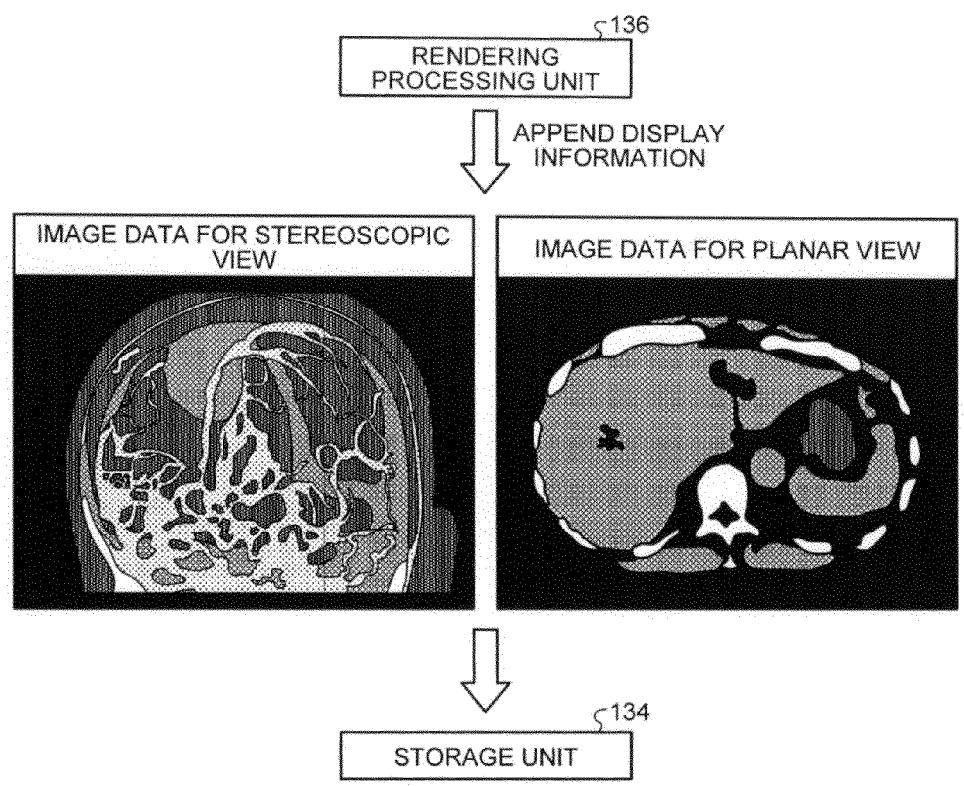

_US 8,659,645 B2_

SYSTEM, APPARATUS, AND METHOD FOR IMAGE DISPLAY AND MEDICAL IMAGE DIAGNOSIS APPARATUS

CROSS-REFERENCE TO RELATED APPLICATIONS

This application is based upon and claims the benefit of priority from Japanese Patent Application No. 2011-158029, filed on Jul. 19, 2011; the entire contents of which are incorporated herein by reference.

FIELD

Embodiments described herein relate generally to a system, an apparatus, and a method for image display and a medical image diagnosis apparatus.

BACKGROUND

Conventionally, monitors enabling an observer to view two-parallax images captured from two viewpoints stereoscopically by using a specific device, such as a pair of stereoscopic vision glasses, have been in practical use. Furthermore, in recent years, monitors enabling an observer to view multi-parallax images (e.g., nine-parallax images) captured from a plurality of viewpoints stereoscopically with the naked eyes by using a beam control element, such as a lenticular lens, have also been in practical use. Such two-parallax images and nine-parallax images displayed on monitors enabling stereoscopic vision may be generated by estimating depth information of an image captured from one viewpoint and performing image processing with the information thus estimated.

As for medical image diagnosis apparatuses, such as X-ray computed tomography (CT) apparatuses, magnetic resonance imaging (MRI) apparatuses, and ultrasound diagnosis apparatuses, apparatuses capable of generating three-dimensional medical image data (hereinafter, referred to as volume data) have been in practical use. Conventionally, volume data generated by such a medical image diagnosis apparatus is converted into a two-dimensional image by various types of image processing, and is displayed two-dimensionally on a general-purpose monitor. For example, volume data generated by a medical image diagnosis apparatus is converted into a two-dimensional image that reflects three-dimensional information by volume rendering processing, and is displayed two-dimensionally on a general-purpose monitor.

In the conventional techniques, however, it is difficult to display the three-dimensional images capable of providing a stereoscopic view and the two-dimensional images in a manner suitable for each of different circumstances.

BRIEF DESCRIPTION OF THE DRAWINGS

FIG. 7 is a drawing for explaining exemplary configurations of a display unit and a control unit according to the first embodiment;

FIG. 8 is a drawing for explaining an exemplary configuration of a switching unit according to the first embodiment;

FIG. 9 is a schematic drawing of an example of a process performed by a display information appending unit according to the first embodiment;

DETAILED DESCRIPTION

According to an embodiment, an image display system includes a controlling apparatus configured to control displays of images and a display apparatus configured to display one or more images under the control of the controlling apparatus. The controlling apparatus includes a judging unit and a switching control unit. The judging unit configured to, based on information related to viewing of the images, judge whether each of the images to be displayed by the display apparatus is an image for a stereoscopic view or an image for a planar view. The switching control unit configured to exercise control so as to switch the display apparatus into a stereoscopic view mode or a planar view mode, according to a judgment result of the judging unit. The display apparatus include a switching unit. The switching unit configured to switch the display apparatus into the stereoscopic view mode or the planar view mode, according to the control of the switching control unit.

Hereinafter, embodiments of a system, an apparatus, and a method for image display and a medical image diagnosis apparatus will be described in detail with reference to the accompanying drawings. In the following, an image display system including a workstation with a function as an image display apparatus is described as an embodiment. Here, the terminology used in the following embodiments is described. A "parallax image group" refers to an image group which is generated by performing a volume rendering process on volume data while moving a point-of-view position by a predetermined parallactic angle at a time. In other words, the "parallax image group" is configured with a plurality of "parallax images" having different "point-of-view positions." Further, a "parallactic angle" refers to an angle determined by an adjacent point-of-view position among point-of-view positions set to generate the "parallax image group" and a predetermined position in a space (the center of a space) represented by volume data. Further, a "parallax number" refers to the number of "parallax images" necessary to implement a stereoscopic view by a stereoscopic display monitor. Further, a "nine-parallax image" described in the following refers to a "parallax image group" consisting of nine "parallax images." Furthermore, a "two-parallax image" described in the following refers to a "parallax image group" consisting of two "parallax images."

First Embodiment

Figure 1:
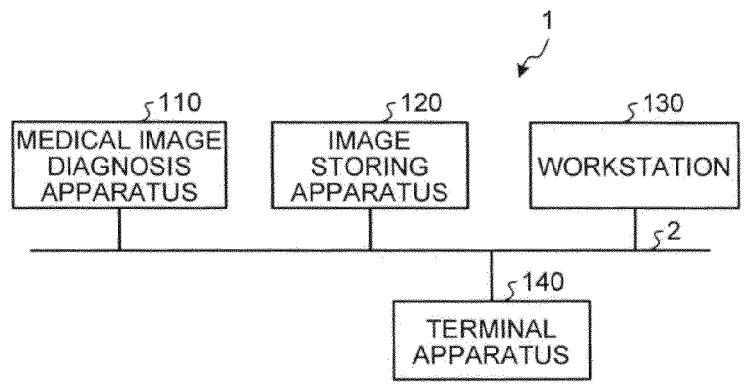
FIG. 1 is a drawing for explaining an exemplary configuration of an image display system according to a first embodiment.

First, a configuration example of an image display system according to a first embodiment will be described. FIG. 1 is a diagram for explaining an exemplary configuration of an image display system according to a first embodiment.

As illustrated in FIG. 1, an image display system 1 according to the first embodiment includes a medical image diagnosis apparatus 110, an image storage device 120, a workstation 130, and a terminal device 140. The respective devices illustrated in FIG. 1 are connected to directly or indirectly communicate one another, for example, via a hospital Local Area Network (LAN) 2 installed in a hospital. For example, when a Picture Archiving and Communication System (PACS) is introduced into the image display system 1, the respective devices exchange a medical image or the like with one another according to a Digital Imaging and Communications in Medicine (DICOM) standard.

The image display system 1 generates a parallax image group from volume data, which is three-dimensional medical image data, generated by the medical image diagnosis apparatus 110, and displays the parallax image group on a monitor enabling stereoscopic vision. Thus, the image display system 1 provides a medical image capable of being viewed stereoscopically to a doctor or a laboratory technician who works for the hospital. Specifically, in the first embodiment, the workstation 130 performs various types of image processing on volume data to generate a parallax image group. The workstation 130 and the terminal device 140 have a monitor enabling stereoscopic vision, and display the parallax image group generated by the workstation 130 on the monitor. The image storage device 120 stores therein the volume data generated by the medical image diagnosis apparatus 110 and the parallax image group generated by the workstation 130. In other words, the workstation 130 and the terminal device 140 acquire the volume data and the parallax image group from the image storage device 120 to process the volume data and to display the parallax image group on the monitor. The devices will be explained below in order.

The medical image diagnosis apparatus 110 is an X-ray diagnosis apparatus, an X-ray Computed Tomography (CT) apparatus, a Magnetic Resonance Imaging (MRI) apparatus, an ultrasonic diagnostic device, a Single Photon Emission Computed Tomography (SPECT) device, a Positron Emission computed Tomography (PET) apparatus, a SPECT-CT apparatus in which a SPECT apparatus is integrated with an X-ray CT apparatus, a PET-CT apparatus in which a PET apparatus is integrated with an X-ray CT apparatus, a device group thereof, or the like. The medical image diagnosis apparatus 110 according to the first embodiment can generate 3D medical image data (volume data).

Specifically, the medical image diagnosis apparatus 110 according to the first embodiment captures a subject, and generates volume data. For example, the medical image diagnosis apparatus 110 generates volume data such that it collects data such as projection data or an MR signal by capturing a subject, and then reconstructs medical image data including a plurality of axial planes along a body axis direction of a subject based on the collected data. The medical image diagnosis apparatus 110 reconstructs medical image data of 500 axial planes, for example. The medical image data group of 500 axial planes corresponds to volume data. Alternatively, projection data or an MR signal of a subject captured by the medical image diagnosis apparatus 110 may be used as volume data.

The medical image diagnosis apparatus 110 according to the first embodiment transmits the generated volume data to the image storage device 120. When the medical image diagnosis apparatus 110 transmits the volume data to the image storage device 120, the medical image diagnosis apparatus 110 transmits supplementary information such as a patient ID identifying a patient, an inspection ID identifying an inspection, a apparatus ID identifying the medical image diagnosis apparatus 110, and a series ID identifying single shooting by the medical image diagnosis apparatus 110, for example.

The image storage device 120 is a database that stores a medical image. Specifically, the image storage device 120 according to the first embodiment stores volume data transmitted from the medical image diagnosis apparatus 110 in a storage unit to store the volume data therein. Further, in the first embodiment, the workstation 130 generates a parallax image group based on the volume data, and transmits the generated parallax image group to the image storage device 120. Thus, the image storage device 120 stores a parallax image group transmitted from the workstation 130 in the storage unit to store the parallax image group therein. Further, in the present embodiment, the workstation 130 capable of storing a large amount of images may be used, and in this case, the image storage device 120 illustrated in FIG. 1 may be incorporated with the workstation 130 illustrated in FIG. 1. In other words, in the present embodiment, the volume data or the parallax image group may be stored in the workstation 130.

Further, in the first embodiment, the volume data or the parallax image group stored in the image storage device 120 is stored in association with the patient ID, the inspection ID, the apparatus ID, the series ID, and the like. Thus, the workstation 130 or the terminal device 140 performs a search using the patient ID, the inspection ID, the apparatus ID, the series ID, or the like, and acquires necessary volume data or a necessary parallax image group from the image storage device 120.

The workstation 130 is an image processing apparatus that performs image processing on a medical image. Specifically, the workstation 130 according to the first embodiment performs various types of rendering processing on the volume data acquired from the image storage device 120 to generate a parallax image group. The parallax image group is a plurality of parallax images captured from a plurality of viewpoints. A parallax image group displayed on a monitor enabling an observer to view nine-parallax images stereoscopically with the naked eyes is nine parallax images whose viewpoint positions are different from one another.

The workstation 130 according to the first embodiment includes a monitor enabling stereoscopic vision (hereinafter, referred to as a stereoscopic display monitor) as a display unit. The workstation 130 generates a parallax image group, and displays the parallax image group thus generated on the stereoscopic display monitor. As a result, an operator of the workstation 130 can perform an operation for generating the parallax image group while checking a medical image that is displayed on the stereoscopic display monitor and capable of being viewed stereoscopically.

The workstation 130 transmits the parallax image group thus generated to the image storage device 120. When transmitting the parallax image group to the image storage device 120, the workstation 130 transmits the patient ID, the examination ID, the apparatus ID, and the series ID, for example, as additional information. Examples of the additional information transmitted when the workstation 130 transmits the parallax image group to the image storage device 120 include additional information related to the parallax image group. Examples of the additional information related to the parallax image group include the number of parallax images (e.g., "nine") and the resolution of the parallax image (e.g., "466× 350 pixels").

To generate and display multi-parallax images sequentially, the workstation 130 according to the first embodiment generates and displays parallax images of different parallax positions alternately between continuous time-phase data. As a result, the workstation 130 can display sequential multi-parallax images smoothly even if the sequential multi-parallax images are generated and displayed in real time. This operation will be described later in detail.

The terminal device 140 is a device that allows a doctor or a laboratory technician who works in the hospital to view a medical image. Examples of the terminal device 140 include a Personal Computer (PC), a tablet-type PC, a Personal Digital Assistant (PDA), and a portable telephone, which are operated by a doctor or a laboratory technician who works in the hospital. Specifically, the terminal device 140 according to the first embodiment includes a stereoscopic display monitor as a display unit. Further, the terminal device 140 acquires a parallax image group from the image storage device 120, and causes the acquired parallax image group to be displayed on the stereoscopic display monitor. As a result, a doctor or a laboratory technician who is an observer can view a stereoscopically viewable medical image.

Here, the stereoscopic display monitor included in the workstation 130 or the terminal device 140 will be described. A general-purpose monitor which is currently most widely used two dimensionally displays a two-dimensional (2D) image and hardly performs a 3D display on a 2D image. If an observer desires a stereoscopic view to be displayed on the general-purpose monitor, a device that outputs an image to the general-purpose monitor needs to parallel-display a two-parallax image stereoscopically viewable to an observer through a parallel method or an intersection method. Alternatively, a device that outputs an image to the general-purpose monitor needs to display an image stereoscopically viewable to an observer through a color-complementation method using glasses in which a red cellophane is attached to a left-eye portion and a blue cellophane is attached to a right-eye portion.

Meanwhile, there are stereoscopic display monitors that allow a two-parallax image (which is also referred to as a "binocular parallax image") to be stereoscopically viewed using a dedicated device such as stereoscopic glasses.

Figure 2A:
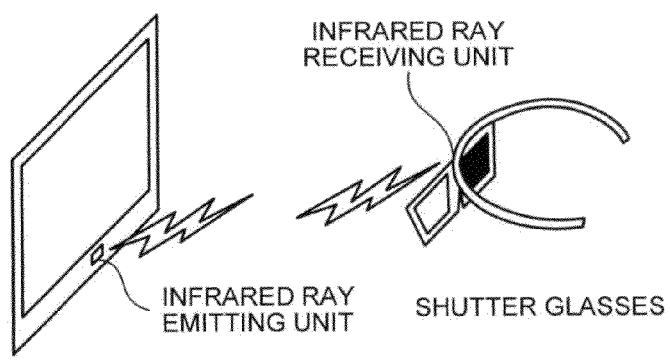
FIG. 2A is a drawing for explaining an example of a stereoscopic display monitor that realizes a stereoscopic display by using two-eye parallax images.
Figure 2B:
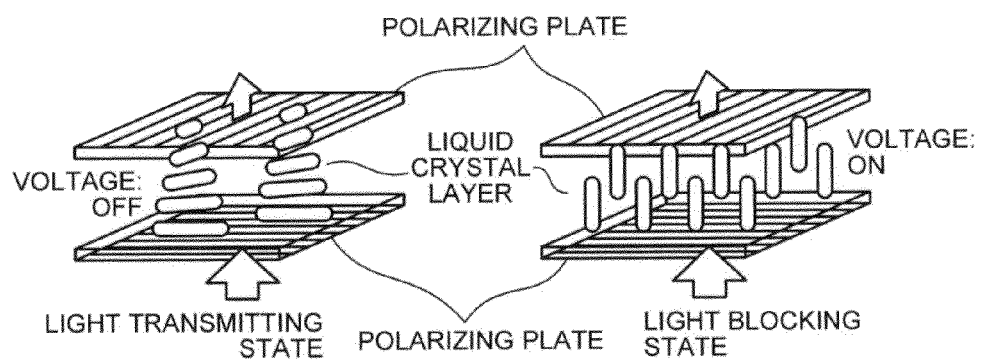
FIG. 2B is another drawing for explaining the example of the stereoscopic display monitor that realizes the stereoscopic display by using the two-eye parallax images.

FIG. 2A and FIG. 2B are schematics for explaining an example of a stereoscopic display monitor that performs stereoscopic display using two-parallax images. In the example illustrated in FIGS. 2A and 2B, the stereoscopic display monitor performs a stereoscopic display by a shutter method, and shutter glasses are used as stereoscopic glasses worn by an observer who observes the monitor. The stereoscopic display monitor alternately outputs a two-parallax image in the monitor. For example, the monitor illustrated in FIG. 2A alternately outputs a left-eye image and a right-eye image with 120 Hz. As illustrated in FIG. 2A, the monitor includes an infrared-ray output unit, and controls an output of an infrared ray according to a timing at which images are switched.

The infrared ray output from the infrared-ray output unit is received by an infrared-ray receiving unit of the shutter glasses illustrated in FIG. 2A. A shutter is mounted to each of right and left frames of the shutter glasses, and the shutter glasses alternately switch a transmission state and a light shielding state of the right and left shutters according to a timing at which the infrared-ray receiving unit receives the infrared ray. A switching process of a transmission state and a light shielding state of the shutter will be described below.

As illustrated in FIG. 2B, each shutter includes an incident side polarizing plate and an output side polarizing plate, and further includes a liquid crystal layer disposed between the incident side polarizing plate and the output side polarizing plate. The incident side polarizing plate and the output side polarizing plate are orthogonal to each other as illustrated in FIG. 2B. Here, as illustrated in FIG. 2B, in an OFF state in which a voltage is not applied, light has passed through the incident side polarizing plate rotates at 90° due to an operation of the liquid crystal layer, and passes through the output side polarizing plate. In other words, the shutter to which a voltage is not applied becomes a transmission state.

Meanwhile, as illustrated in FIG. 2B, in an ON state in which a voltage is applied, a polarization rotation operation caused by liquid crystal molecules of the liquid crystal layer does not work, and thus light having passed through the incident side polarizing plate is shielded by the output side polarizing plate. In other words, the shutter to which a voltage is applied becomes a light shielding state.

In this regard, for example, the infrared-ray output unit outputs the infrared ray during a time period in which the left-eye image is being displayed on the monitor. Then, during a time period in which the infrared ray is being received, the infrared-ray receiving unit applies a voltage to the right-eye shutter without applying a voltage to the left-eye shutter. Through this operation, as illustrated in FIG. 2A, the right-eye shutter becomes the light shielding state, and the left-eye shutter becomes the transmission state, so that the left-eye image is incident to the left eye of the observer. Meanwhile, during a time period in which the right-eye image is being displayed on the monitor, the infrared-ray output unit stops an output of the infrared ray. Then, during a time period in which the infrared ray is not being received, the infrared-ray receiving unit applies a voltage to the left-eye shutter without applying a voltage to the right-eye shutter. Through this operation, the left-eye shutter becomes the light shielding state, and the right-eye shutter becomes the transmission state, so that the right-eye image is incident to the right eye of the observer. As described above, the stereoscopic display monitor illustrated in FIGS. 2A and 2B causes an image stereoscopically viewable to the observer to be displayed by switching an image to be displayed on the monitor in conjunction with the state of the shutter. A monitor employing a polarizing glasses method other than the shutter method is also known as the stereoscopic display monitor that allows a two-parallax image to be stereoscopically viewed.

Further, a stereoscopic display monitor that allows an observer to stereoscopically view a multi-parallax image with the naked eyes such as a nine-parallax image using a light beam controller such as a lenticular lens has been recently put to practical. This kind of stereoscopic display monitor makes a stereoscopic view possible by binocular parallax, and further makes a stereoscopic view possible by kinematic parallax in which an observed video changes with the movement of a point of view of an observer.

Figure 3:
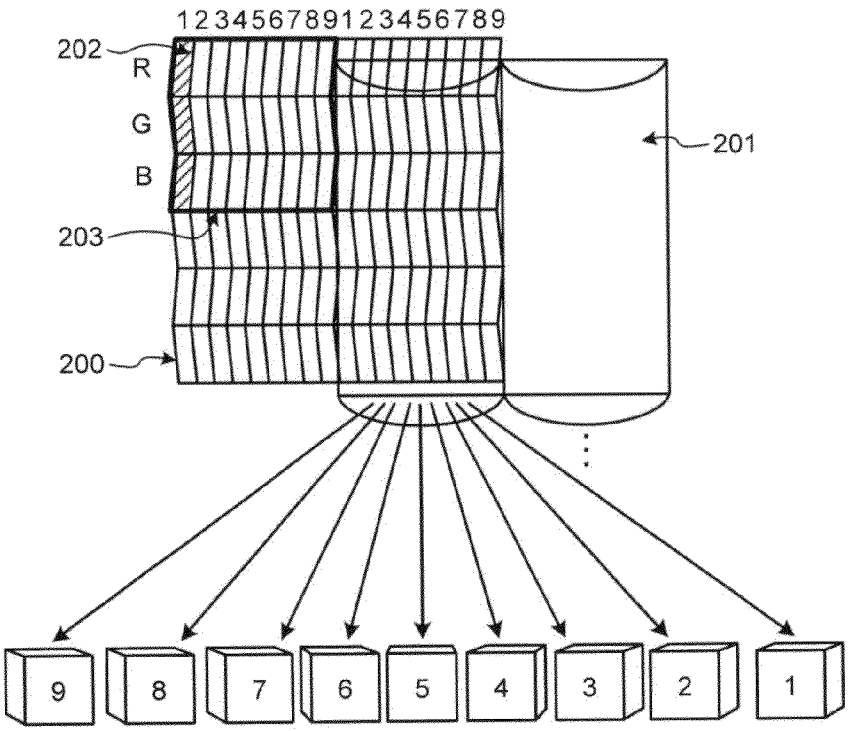
FIG. 3 is a drawing for explaining an example of a stereoscopic display monitor that realizes a stereoscopic display by using nine-parallax images.

FIG. 3 is a schematic for explaining an example of a stereoscopic display monitor that performs stereoscopic display using nine-parallax images. In the stereoscopic display monitor illustrated in FIG. 3, a light beam controller is arranged in front of a planar display surface 200 such as a liquid crystal panel. For example, in the stereoscopic display monitor illustrated in FIG. 3, a vertical lenticular sheet 201 including an optical opening that extends in a vertical direction is attached to the front surface of the display surface 200 as the light beam controller.

As illustrated in FIG. 3, in the display surface 200, an aspect ratio is 3:1, and pixels 202 each of which includes three sub-pixels of red (R), green (G), and blue (B) arranged in a longitudinal direction are arranged in the form of a matrix. The stereoscopic display monitor illustrated in FIG. 3 converts a nine-parallax image including nine images into an interim image arranged in a predetermined format (for example, in a lattice form), and outputs the interim image to the display surface 200. In other words, the stereoscopic display monitor illustrated in FIG. 3 allocates nine pixels at the same position in the nine-parallax image to the pixels 202 of nine columns, respectively, and then performs an output. The pixels 202 of nine columns become a unit pixel group 203 to simultaneously display nine images having different point-of-view positions.

The nine-parallax image simultaneously output as the unit pixel group 203 in the display surface 200 is radiated as parallel light through a Light Emitting Diode (LED) backlight, and further radiated in multiple directions through the vertical lenticular sheet 201. As light of each pixel of the nine-parallax image is radiated in multiple directions, lights incident to the left eye and the right eye of the observer change in conjunction with the position (the position of the point of view) of the observer. In other words, depending on an angle at which the observer views, a parallax image incident to the right eye differs in a parallactic angle from a parallax image incident to the left eye. Through this operation, the observer can stereoscopically view a shooting target, for example, at each of nine positions illustrated in FIG. 3. For example, the observer can stereoscopically view, in a state in which the observer directly faces a shooting target, at the position of "5" illustrated in FIG. 3, and can stereoscopically view, in a state in which a direction of a shooting target is changed, at the positions other than "5" illustrated in FIG. 3. The stereoscopic display monitor illustrated in FIG. 3 is merely an example. The stereoscopic display monitor that displays the nine-parallax image may include a horizontal stripe liquid crystal of "RRR---, GGG---, and BBB---" as illustrated in FIG. 3 or may include a vertical stripe liquid crystal of "RGBRGB---." Further, the stereoscopic display monitor illustrated in FIG. 3 may be of a vertical lens type in which a lenticular sheet is vertical as illustrated in FIG. 3 or may be of an oblique lens type in which a lenticular sheet is oblique.

The configuration example of the image display system 1 according to the first embodiment has been briefly described so far. An application of the image display system 1 described above is not limited to a case in which the PACS is introduced. For example, the image display system 1 is similarly applied even to a case in which an electronic chart system for managing an electronic chart with a medical image attached thereto is introduced. In this case, the image storage device 120 serves as a database for managing an electronic chart. Further, for example, the image display system 1 is similarly applied even to a case in which a Hospital Information System (HIS) or Radiology Information System (RIS) is introduced. Further, the image display system 1 is not limited to the above-described configuration example. A function or an assignment of each device may be appropriately changed according to an operation form.

Figure 4:
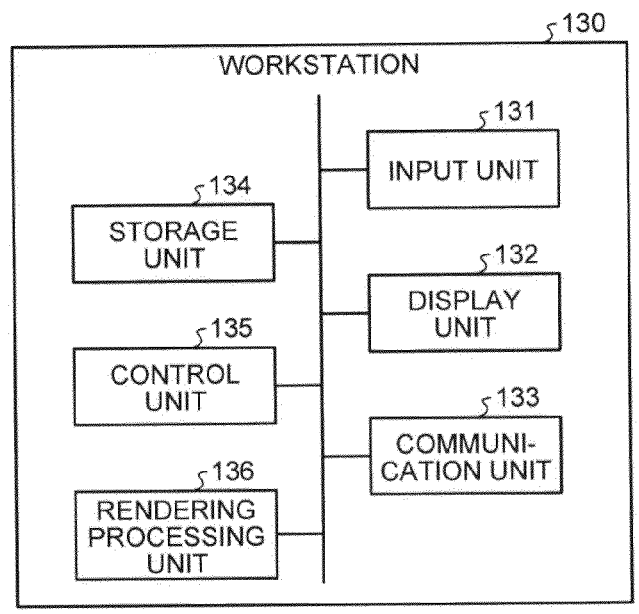
FIG. 4 is a drawing for explaining an exemplary configuration of a workstation according to the first embodiment.

Next, a configuration example of a workstation according to the first embodiment will be described with reference to FIG. 4. FIG. 4 is a diagram for explaining an exemplary configuration of a workstation according to the first embodiment. In the following, a "parallax image group" refers to an image group for a stereoscopic view generated by performing a volume rendering process on volume data. Further, a "parallax image" refers to each of images that configure the "parallax image group." In other words, the "parallax image group" is configured with a plurality of "parallax images" having different point-of-view positions.

The workstation 130 according to the first embodiment is a high-performance computer appropriate to image processing or the like, and includes an input unit 131, a display unit 132, a communication unit 133, a storage unit 134, a control unit 135, and a rendering processing unit 136 as illustrated in FIG. 4. In the following, a description will be made in connection with an example in which the workstation 130 is a high-performance computer appropriate to image processing or the like. However, the workstation 130 is not limited to this example, and may be an arbitrary information processing device. For example, the workstation 130 may be an arbitrary personal computer.

The input unit 131 includes a mouse, a keyboard, a trackball, or the like, and receives various operations which an operator has input on the workstation 130. Specifically, the input unit 131 according to the first embodiment receives an input of information used to acquire volume data which is a target of the rendering process from the image storage device 120. For example, the input unit 131 receives an input of the patient ID, the inspection ID, the apparatus ID, the series ID, or the like. Further, the input unit 131 according to the first embodiment receives an input of a condition (hereinafter, referred to as a "rendering condition") related to the rendering process.

The display unit 132 includes a liquid crystal panel serving as a stereoscopic display monitor, and displays a variety of information. Specifically, the display unit 132 according to the first embodiment displays a Graphical User Interface (GUI), which is used to receive various operations from the operator, a parallax image group, or the like. The communication unit 133 includes a Network Interface Card (NIC) or the like and performs communication with other devices.

The storage unit 134 includes a hard disk, a semiconductor memory device, or the like, and stores a variety of information. Specifically, the storage unit 134 according to the first embodiment stores the volume data acquired from the image storage device 120 through the communication unit 133. Further, the storage unit 134 according to the first embodiment stores therein volume data on which the rendering process is currently being performed, the groups of parallax images generated as a result of the rendering process, images for realizing a two-dimensional display, and the like.

The control unit 135 includes an electronic circuit such as a Central Processing Unit (CPU), a Micro Processing Unit (MPU), or a Graphics Processing Unit (GPU) or an integrated circuit such as an Application Specific Integrated Circuit (ASIC) or a Field Programmable Gate Array (FPGA). The control unit 135 controls the workstation 130 in general.

For example, the control unit 135 according to the first embodiment controls a display of the GUI on the display unit 132 or a display of a parallax image group. Further, for example, the control unit 135 controls transmission/reception of the volume data or the parallax image group to/from the image storage device 120, which is performed through the communication unit 133. Further, for example, the control unit 135 controls the rendering process performed by the rendering processing unit 136. Further, for example, the control unit 135 controls an operation of reading volume data from the storage unit 134 or an operation of storing a parallax image group in the storage unit 134.

In the first embodiment, the control unit 135 of the workstation 130 controls the rendering processing performed by the rendering processing unit 136, and cooperates with the rendering processing unit 136. Thus, the control unit 135 generates parallax images of different parallax positions alternately between continuous time-phase data and displays the parallax images on the display unit 132. This operation will be described later in detail.

The rendering processing unit 136 performs various rendering processes on volume data acquired from the image storage device 120 under control of the control unit 135, and thus generates a parallax image group. Specifically, the rendering processing unit 136 according to the first embodiment reads volume data from the storage unit 134, and first performs pre-processing on the volume data. Next, the rendering processing unit 136 performs a volume rendering process on the pre-processed volume data, and generates a parallax image group. Subsequently, the rendering processing unit 136 generates a 2D image in which a variety of information (a scale, a patient name, an inspection item, and the like) is represented, and generates a 2D output image by superimposing the 2D image on each parallax image group. Then, the rendering processing unit 136 stores the generated parallax image group or the 2D output image in the storage unit 134. Further, in the first embodiment, the rendering process refers to the entire image processing performed on the volume data, and the volume rendering process a process of generating a 2D image in which 3D information is reflected during the rendering process. For example, the medical image generated by the rendering process corresponds to a parallax image.

Figure 5:
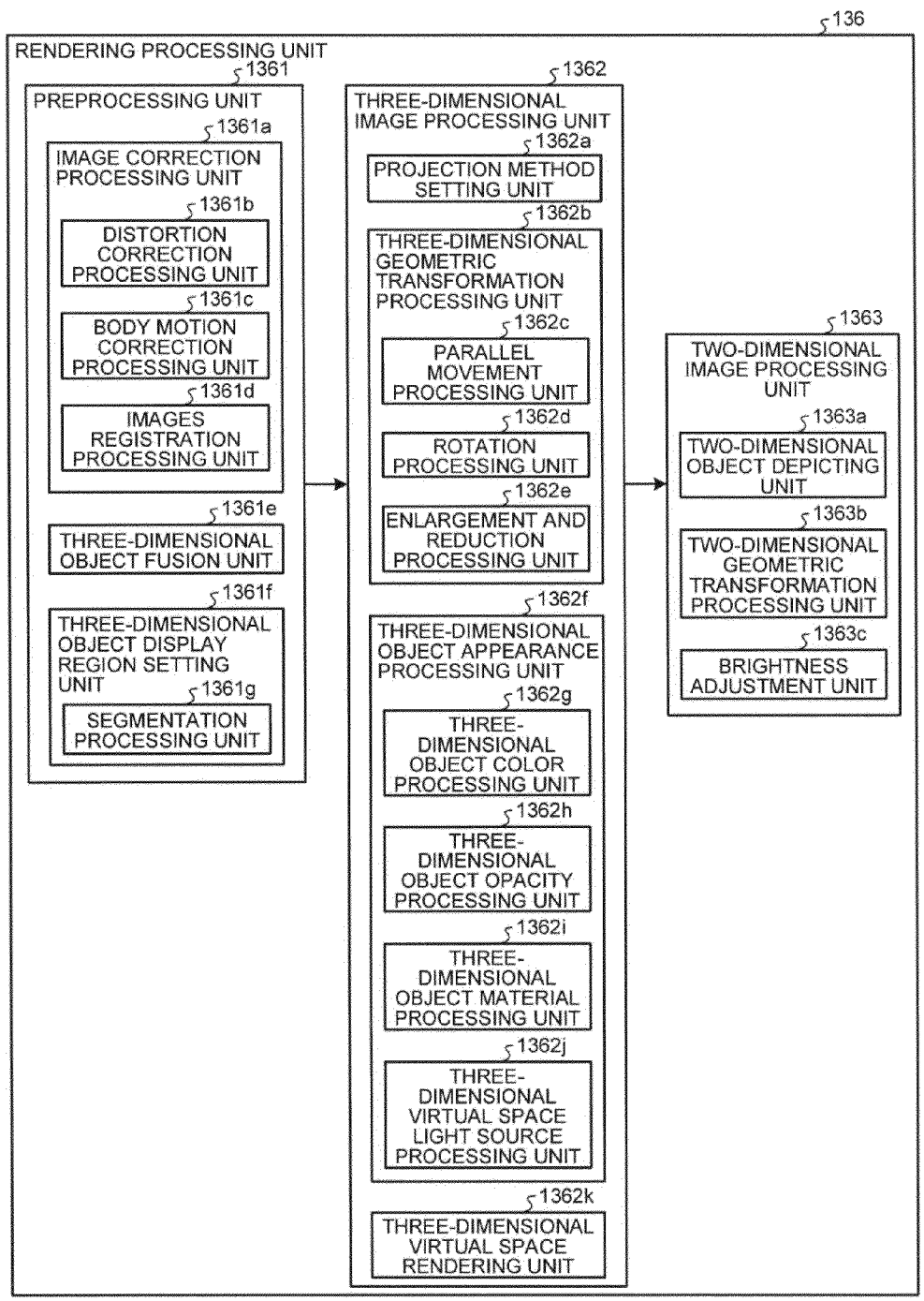
FIG. 5 is a drawing for explaining an exemplary configuration of a rendering processing unit shown in FIG. 4.

FIG. 5 is a diagram for explaining an exemplary configuration of a rendering processing unit illustrated in FIG. 4. As illustrated in FIG. 5, the rendering processing unit 136 includes a pre-processing unit 1361, a 3D image processing unit 1362, and a 2D image processing unit 1363. The pre-processing unit 1361 performs pre-processing on volume data. The 3D image processing unit 1362 generates a parallax image group from pre-processed volume data. The 2D image processing unit 1363 generates a 2D output image in which a variety of information is superimposed on a parallax image group. The respective units will be described below in order.

The pre-processing unit 1361 is a processing unit that performs a variety of pre-processing when performing the rendering process on volume data, and includes an image correction processing unit 1361a, a 3D object fusion unit 1361e, and a 3D object display region setting unit 1361f.

The image correction processing unit 1361a is a processing unit that performs an image correction process when processing two types of volume data as one volume data, and includes a distortion correction processing unit 1361b, a body motion correction processing unit 1361c, and an images registration processing unit 1361d as illustrated in FIG. 5. For example, the image correction processing unit 1361a performs an image correction process when processing volume data of a PET image generated by a PET-CT apparatus and volume data of an X-ray CT image as one volume data. Alternatively, the image correction processing unit 1361a performs an image correction process when processing volume data of a T1-weighted image and volume data of a T2-weighted image which are generated by an MRI apparatus as one volume data.

Further, the distortion correction processing unit 1361b corrects distortion of individual volume data caused by a collection condition at the time of data collection by the medical image diagnosis apparatus 110. Further, the body motion correction processing unit 1361c corrects movement caused by body motion of a subject during a data collection time period used to generate individual volume data. Further, the images registration processing unit 1361d performs positioning (registration), for example, using a cross correlation method between two pieces of volume data which have been subjected to the correction processes by the distortion correction processing unit 1361b and the body motion correction processing unit 1361c.

The 3D object fusion unit 1361e performs the fusion of a plurality of volume data which have been subjected to the positioning by the images registration processing unit 1361d. Further, the processes performed by the image correction processing unit 1361a and the 3D object fusion unit 1361e may not be performed when the rendering process is performed on single volume data.

The 3D object display region setting unit 1361f is a processing unit that sets a display area corresponding to a display target organ designated by an operator, and includes a segmentation processing unit 1361g. The segmentation processing unit 1361g is a processing unit that extracts an organ, such as a heart, a lung, or a blood vessel, which is designated by the operator, for example, by an area extension technique based on a pixel value (voxel value) of volume data.

Further, the segmentation processing unit 1361g does not perform the segmentation process when a display target organ has not been designated by the operator. Further, the segmentation processing unit 1361g extracts a plurality of corresponding organs when a plurality of display target organs is designated by the operator. Further, the process performed by the segmentation processing unit 1361g may be re-executed at a fine adjustment request of the operator who has referred to a rendering image.

The 3D image processing unit 1362 performs the volume rendering process on the pre-processed volume data which has been subjected to the process performed by the pre-processing unit 1361. As processing units for performing the volume rendering process, the 3D image processing unit 1362 includes a projection method setting unit 1362a, a 3D geometric transformation processing unit 1362b, a 3D object appearance processing unit 1362f, and a 3D virtual space rendering unit 1362k.

The projection method setting unit 1362a determines a projection method for generating a parallax image group. For example, the projection method setting unit 1362a determines whether the volume rendering process is to be executed using a parallel projection method or a perspective projection method.

The 3D geometric transformation processing unit 1362b is a processing unit that determines information necessary to perform 3D geometric transform on volume data which is to be subjected to the volume rendering process, and includes a parallel movement processing unit 1362c, a rotation processing unit 1362d, and a enlargement and reduction processing unit 1362e. The parallel movement processing unit 1362c is a processing unit that determines a shift amount to shift volume data in parallel when a point-of-view position is shifted in parallel at the time of the volume rendering process. The rotation processing unit 1362d is a processing unit that determines a movement amount for rotationally moving volume data when a point-of-view position is rotationally moved at the time of the volume rendering process. Further, the enlargement and reduction processing unit 1362e is a processing unit that determines an enlargement ratio or a reduction ratio of volume data when it is requested to enlarge or reduce a parallax image group.

The 3D object appearance processing unit 1362f includes a 3D object color processing unit 1362g, a 3D object opacity processing unit 1362h, a 3D object material processing unit 1362i, and a 3D virtual space light source processing unit 1362j. The 3D object appearance processing unit 1362f performs a process of determining a display form of a parallax image group to be displayed through the above processing units, for example, according to the operator's request.

The 3D object color processing unit 1362g is a processing unit that determines a color colored to each area segmented from volume data. The 3D object opacity processing unit 1362h is a processing unit that determines opacity of each voxel configuring each area segmented from volume data. In volume data, an area behind an area having opacity of "100%" is not represented in a parallax image group. Further, in volume data, an area having opacity of "0%" is not represented in a parallax image group.

The 3D object material processing unit 1362i is a processing unit that determines the quality of a material of each area segmented from volume data and adjusts the texture when the area is represented. The 3D virtual space light source processing unit 1362j is a processing unit that determines the position or the type of a virtual light source installed in a 3D virtual space when the volume rendering process is performed on volume data. Examples of the type of a virtual light source include a light source that emits a parallel beam from infinity and a light source that emits a radial beam from a point of view.

The 3D virtual space rendering unit 1362k performs the volume rendering process on volume data, and generates a parallax image group. Further, the 3D virtual space rendering unit 1362k uses a variety of information, which is determined by the projection method setting unit 1362a, the 3D geometric transformation processing unit 1362b, and the 3D object appearance processing unit 1362f, as necessary when the volume rendering process is performed.

Here, the volume rendering process performed by the 3D virtual space rendering unit 1362k is performed according to the rendering condition. For example, the parallel projection method or the perspective projection method may be used as the rendering condition. Further, for example, a reference point-of-view position, a parallactic angle, and a parallax number may be used as the rendering condition. Further, for example, a parallel shift of a point-of-view position, a rotational movement of a point-of-view position, an enlargement of a parallax image group, and a reduction of a parallax image group may be used as the rendering condition. Further, for example, a color colored, transparency, the texture, the position of a virtual light source, and the type of virtual light source may be used as the rendering condition. The rendering condition may be input by the operator through the input unit 131 or may be initially set. In either case, the 3D virtual space rendering unit 1362k receives the rendering condition from the control unit 135, and performs the volume rendering process on volume data according to the rendering condition. Further, at this time, the projection method setting unit 1362a, the 3D geometric transformation processing unit 1362b, and the 3D object appearance processing unit 1362f determine a variety of necessary information according to the rendering condition, and thus the 3D virtual space rendering unit 1362k generates a parallax image group using a variety of information determined.

Figure 6:
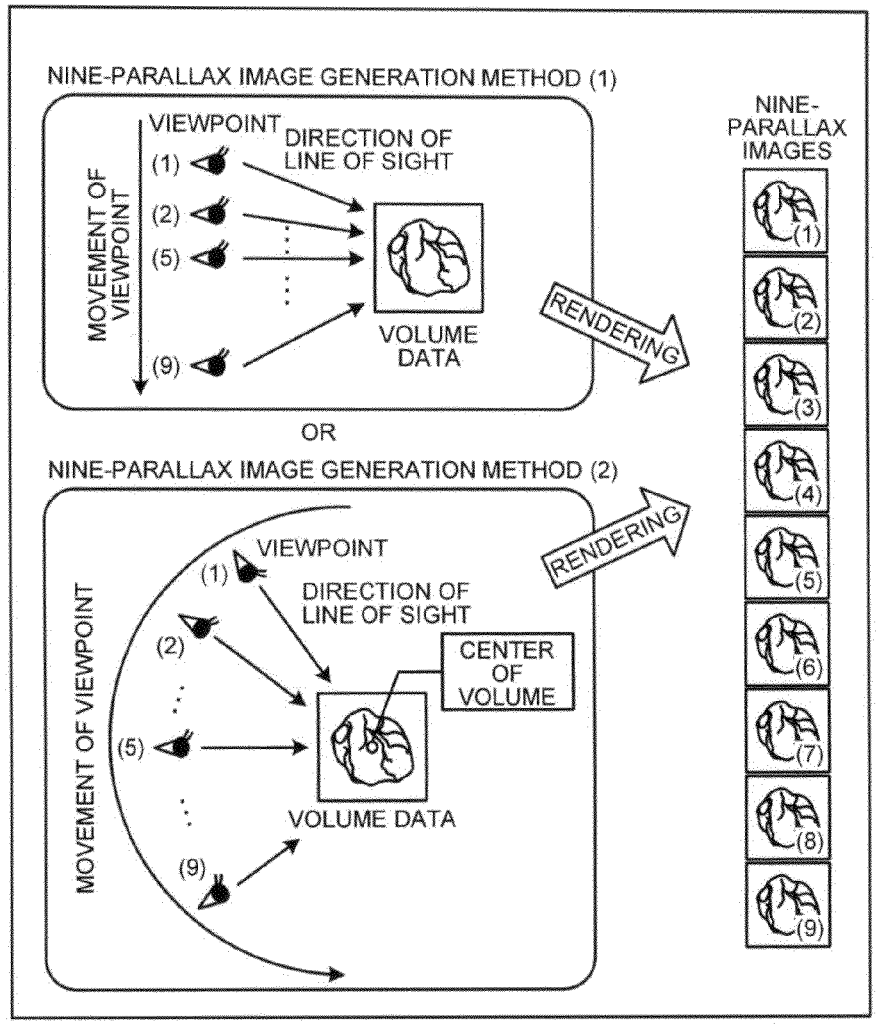
FIG. 6 is a drawing for explaining an example of a volume rendering process according to the first embodiment.

FIG. 6 is a schematic for explaining an example of volume rendering processing according to the first embodiment. For example, let us assume that the 3D virtual space rendering unit 1362k receives the parallel projection method as the rendering condition, and further receives a reference point-of-view position (5) and a parallactic angle "1°" as illustrated in a "nine-parallax image generating method (1)" of FIG. 6. In this case, the 3D virtual space rendering unit 1362k shifts the position of a point of view to (1) to (9) in parallel so that the parallactic angle can be changed by "1", and generates nine parallax images between which the parallactic angle (an angle in a line-of-sight direction) differs from each other by 1° by the parallel projection method. Further, when the parallel projection method is performed, the 3D virtual space rendering unit 1362k sets a light source that emits a parallel beam in a line-of-sight direction from infinity.

Alternatively, the 3D virtual space rendering unit 1362k receives the perspective projection method as the rendering condition, and further receives a reference point-of-view position (5) and a parallactic angle "1°" as illustrated in a "nine-parallax image generating method (2)" of FIG. 6. In this case, the 3D virtual space rendering unit 1362k rotationally moves the position of a point of view to (1) to (9) so that the parallactic angle can be changed by "1°" centering on the center (gravity center) of volume data, and generates nine parallax images between which the parallactic angle differs from each other by 1° by the perspective projection method. Further, when the perspective projection method is performed, the 3D virtual space rendering unit 1362k sets a point light source or a surface light source, which three-dimensionally emits light in a radial manner centering on a line-of-sight direction, at each point of view. Further, when the perspective projection method is performed, the points of view (1) to (9) may be parallel-shifted according to the rendering condition.

Further, the 3D virtual space rendering unit 1362k may perform the volume rendering process using the parallel projection method and the perspective projection method together by setting a light source that two-dimensionally emits light in a radial manner centering on the line-of-sight direction on a longitudinal direction of a volume rendering image to display, and emits a parallel beam in the line-of-sight direction from infinity on a transverse direction of a volume rendering image to display.

The nine parallax images generated in the above-described way configure a parallax image group. In the first embodiment, for example, the nine parallax images are converted into interim images arranged in a predetermined format (for example, a lattice form) by the control unit 135, and then output to the display unit 132 serving as the stereoscopic display monitor. At this time, the operator of the workstation 130 can perform an operation of generating a parallax image group while checking a stereoscopically viewable medical image displayed on the stereoscopic display monitor.

The example of FIG. 6 has been described in connection with the case in which the projection method, the reference point-of-view position, and the parallactic angle are received as the rendering condition. However, similarly even when any other condition is received as the rendering condition, the 3D virtual space rendering unit 1362k generates the parallax image group while reflecting each rendering condition.

Further, the three-dimensional virtual space rendering unit 1362k not only performs the volume rendering process, but also reconstructs a planar image on an arbitrary plane (e.g., an axial plane, a sagittal plane, or a coronal plane). For example, the three-dimensional virtual space rendering unit 1362k reconstructs a Multi Planar Reconstruction (MPR) image from the volume data by implementing an MPR method. In addition, the three-dimensional virtual space rendering unit 1362k also has a function of performing a "curved MPR" and a function of performing an "intensity projection".

Subsequently, the parallax image group which the 3D image processing unit 1362 has generated based on the volume data is regarded as an underlay. Then, an overlay in which a variety of information (a scale, a patient name, an inspection item, and the like) is represented is superimposed on the underlay, so that a 2D output image is generated. The 2D image processing unit 1363 is a processing unit that performs image processing on the overlay and the underlay and generates a 2D output image, and includes a 2D object depicting unit 1363a, a 2D geometric transformation processing unit 1363b, and a brightness adjustment unit 1363c as illustrated in FIG. 5. For example, in order to reduce a load required in a process of generating a 2D output image, the 2D image processing unit 1363 generates nine 2D output images by superimposing one overlay on each of nine parallax images (underlays). In the following, an underlay on which an overlay is superimposed may be referred to simply as a "parallax image."

The 2D object depicting unit 1363a is a processing unit that renders a variety of information represented on the overlay. The 2D geometric transformation processing unit 1363b is a processing unit that parallel-shifts or rotationally moves the position of a variety of information represented on the overlay, or enlarges or reduces a variety of information represented on the overlay.

The brightness adjustment unit 1363c is a processing unit that performs a brightness converting process. For example, the brightness adjustment unit 1363c adjusts brightness of the overlay and the underlay according to an image processing parameter such as gradation of a stereoscopic display monitor of an output destination, a window width (WW), or a window level (WL).

The two-dimensional images to be output that are generated in this manner are temporarily stored in the storage unit 134 by the control unit 135, for example, and are transmitted to the image storage device 120 via the communication unit 133. If the terminal device 140 acquires the two-dimensional images to be output from the image storage device 120, converts the two-dimensional images into an intermediate image in which the two-dimensional images are arranged in a predetermined format (for example, a lattice form), and displays the intermediate image on the stereoscopic display monitor, for example, the doctor or the laboratory technician who is the observer can browse the medical image capable of being viewed stereoscopically with the various types of information (e.g., a scale, a patient name, and an examination item) depicted thereon.

The exemplary configurations of the image display system 1 and the workstation 130 according to the first embodiment have thus been explained. With the configurations as described above, the workstation 130 according to the first embodiment is configured to be able to display the three-dimensional images capable of providing a stereoscopic view and the two-dimensional images in a manner suitable for each of different circumstances, as a result of processes performed by the control unit 135 and the display unit 132, which are explained in detail below. More specifically, the workstation 130 according to the first embodiment switches between a display of the three-dimensional images and a display of the two-dimensional images, according to information related to the viewing of the images or a display method desired by the operator. In this situation, examples of the information related to the viewing of the images include information about the images (e.g., information related to the reconstruction of the images), information about details of the medical examination, and information about the viewer. An example of the information related to the reconstruction of the images is information indicating that the images were reconstructed as three-dimensional images capable of providing a stereoscopic view. In the following sections, an example in which the display of the images is switched by using the information about the images (the information related to the reconstruction of the images) will be explained first. After that, an example in which the display of the images is switched according to a display method desired by the operator will be explained. Hereinafter, three-dimensional images capable of providing a stereoscopic view may be referred to as "stereoscopic images", whereas two-dimensional images may be referred to as "planar images".

First, an example will be explained in which the display is switched between three-dimensional images and two-dimensional images by using the information related to the reconstruction of the images. FIG. 7 is a drawing for explaining exemplary configurations of the display unit 132 and the control unit 135 according to the first embodiment. As shown in FIG. 7, the display unit 132 includes a switching unit 1321. Also, as shown in FIG. 7, the control unit 135 includes a display information appending unit 1351, a switching control unit 1352, a display control unit 1353, and a selected region receiving unit 1354.

According to the control of the switching control unit 1352, which is explained later, the switching unit 1321 switches the display unit 132 into the use for a stereoscopic view (hereinafter, "a stereoscopic view mode") or the use for a planar view (hereinafter, "a planar view mode"). More specifically, by increasing or decreasing directionality of the light caused by a lenticular lens layer provided on the display surface, the switching unit 1321 switches the display unit 132 into the stereoscopic view mode or the planar view mode.

FIG. 8 is a drawing for explaining an exemplary configuration of the switching unit 1321 according to the first embodiment. For example, as shown in FIG. 8, the switching unit 1321 is provided as a liquid crystal lens unit 400 on a display surface 200 of a liquid crystal device 210 that outputs light (i.e., images) and is configured to switch the display unit 132 into the stereoscopic view mode or the planar view mode by increasing or decreasing the directionality of the light caused by the lenticular lens layer. As shown in FIG. 8, the liquid crystal lens unit 400 includes a lenticular lens layer 410 and a liquid crystal part 420, in such a manner that the liquid crystal part 420 is provided on the display surface 200 while being interposed between the lenticular lens layer 410 and the display surface 200.

The lenticular lens layer 410 includes lens-shaped lenticular lenses. Also, the lenticular lens layer 410 has a lens upper part (an upper part of the lenticular lens) formed by using a commonly-used resin and a lens lower part (a lower hollow-wall part of the lenticular lens) in which liquid crystals are enclosed in a solidified state. In this situation, in the lens lower part of the lenticular lens layer 410, the liquid crystals are enclosed while being aligned in a specific direction in nano-level linear structures. For example, as shown in FIG. 8, liquid crystals 411 in the lens lower part are enclosed so as to form nano-level linear structures along the directions of the cylinders of the semi-cylindrical lenticular lenses, in such a manner that the plurality of linear structures are aligned in the vertical direction (the up-and-down direction of FIG. 8).

As shown in FIG. 8, the liquid crystal part 420 is formed by interposing liquid crystals between electrode substrates 421. In this situation, the reference numerals 422 and 423 in FIG. 8 indicate polarization directions of the light entering the liquid crystals interposed between the electrode substrates 421, from the direction of the display surface 200. More specifically, the reference numeral 422 in FIG. 8 indicates that, because the light enters the liquid crystals to which a voltage is being applied, no change is observed in the polarization direction of the light. In contrast, the reference numeral 423 in FIG. 8 indicates that, because the light enters the liquid crystals to which no voltage is being applied, the polarization direction of the light has rotated by 90 degrees.

The switching unit 1321 switches the display unit 132 into the planar view mode or the stereoscopic view mode by controlling the voltage applied from the electrode substrates 421 shown in FIG. 8 so as to decrease or increase the directionality of the light caused by the lenticular lens layer. For example, when being controlled by the switching control unit 1352 (explained later) so as to switch the display unit 132 into the planar view mode, the switching unit 1321 causes a voltage to be applied to the electrode substrates. In other words, no change is observed in the polarization direction of the light entering from the display surface 200 as shown by the reference numeral 422 in FIG. 8, so that the light enters the lenses vertically, which is equal to the direction (i.e., the vertical direction) in which the liquid crystals 411 are aligned within the lenses. As a result, because the traveling speed of the light does not change, and there is no difference in the refractive indexes between the lens lower part and the lens upper part, the light travels straight. In other words, by causing the voltage to be applied to the electrode substrates, the switching unit 1321 switches the display unit 132 into the planar view mode in which the directionality of the light is decreased.

In contrast, for example, when being controlled by the switching control unit 1352 (explained later) so as to switch the display unit 132 into the stereoscopic view mode, the switching unit 1321 stops the application of the voltage to the electrode substrates. In other words, the polarization direction of the light entering from the display surface 200 is such that the light enters the lenses while being rotated by 90 degrees (i.e., being changed to the horizontal direction), as shown by the reference numeral 423 in FIG. 8, so that the direction of the light is orthogonal to the direction (i.e., the vertical direction) in which the liquid crystals 411 are aligned within the lenses. As a result, because the traveling speed of the light decreases, and there is a difference in the refractive indexes between the lens lower part and the lens upper part, the light is refracted. In other words, by stopping the application of the voltage to the electrode substrates, the switching unit 1321 switches the display unit 132 into the stereoscopic view mode in which the directionality of the light is increased.

Returning to the description of FIG. 7, the display information appending unit 1351 appends information for specifying that the images are for a stereoscopic view and information for specifying that the images are for a planar view, to the images for a stereoscopic view and to the images for a planar view, respectively. More specifically, the display information appending unit 1351 appends, as the display information, display information indicating that the images are for a stereoscopic view, to the volume data generated by the medical image diagnosis apparatus 110 or to the groups of parallax images generated by the rendering processing unit 136. In another example, the display information appending unit 1351 appends, as the display information, display information indicating that the images are for a planar view, to the planar images generated by the rendering processing unit 136.

FIG. 9 is a schematic drawing of an example of a process performed by the display information appending unit 1351 according to the first embodiment. As shown in FIG. 9, the display information appending unit 1351 appends display information "image data for a stereoscopic view" to the images for a stereoscopic view. In this situation, the three-dimensional data to which the display information "image data for a stereoscopic view" is appended may be the volume data or may be the groups of parallax images generated from the volume data by the rendering processing unit 136. In another example, the display information appending unit 1351 appends display information "image data for a planar view" to the images for a planar view reconstructed by the rendering processing unit 136. Further, the display information appending unit 1351 stores the image data to which the display information is appended into the storage unit 134. Examples of the method for appending the display information include a method by which the information for specifying that the images are for a stereoscopic view and the information for specifying that the images are for a planar view are each appended to a tag used in the DICOM system, as accompanying information.

Based on the information related to the viewing of the images, the switching control unit 1352 judges whether the images to be displayed by the display unit 132 are images for a stereoscopic view or images for a planar view and exercises control so as to switch the display unit 132 into the stereoscopic view mode or the planar view mode according to the judgment result. More specifically, based on an identifier appended by the display information appending unit 1351, the switching control unit 1352 controls the switching unit 1321 so as to switch the display unit 132 into the stereoscopic view mode or the planar view mode. Even more specifically, when the image data stored in the storage unit 134 is read, the switching control unit 1352 controls the switching unit 1321 so as to switch the display unit 132 into the stereoscopic view mode or the planar view mode, based on the display information appended to the image data that is the target of a reading request. For example, by controlling the application of the voltage in the switching unit 1321 so as to increase or decrease the directionality of the light caused by the lenticular lens layer, the switching control unit 1352 switches the display unit 132 into the stereoscopic view mode or the planar view mode. Because the switching control unit 1352 judges, as explained above, whether the images to be displayed by the display unit 132 are images for a stereoscopic view or images for a planar view, the switching control unit 1352 may be referred to as a judging unit.

For example, if the display information appended to the image data serving as a display target indicates that the images are for a planar view, the switching control unit 1352 controls the switching unit 1321 so that a voltage is applied to the electrode substrates. In another example, if the display information appended to the image data serving as a display target indicates that the images are for a stereoscopic view, the switching control unit 1352 controls the switching unit 1321 so that the application of the voltage to the electrode substrates is stopped.

The display control unit 1353 exercises control so that the display unit 132 displays the image data for a stereoscopic view and the image data for a planar view. More specifically, the display control unit 1353 causes the display unit 132 to display such images for which a display request was received from the operator via the input unit 131. For example, the display control unit 1353 causes stereoscopic images to be displayed by causing the groups of parallax images to be displayed on the display unit 132 that was switched into the stereoscopic view mode by the switching unit 1321. In another example, the display control unit 1353 causes planar images to be displayed on the display unit 132 that was switched into the planar view mode by the switching unit 1321.

Figure 10A:
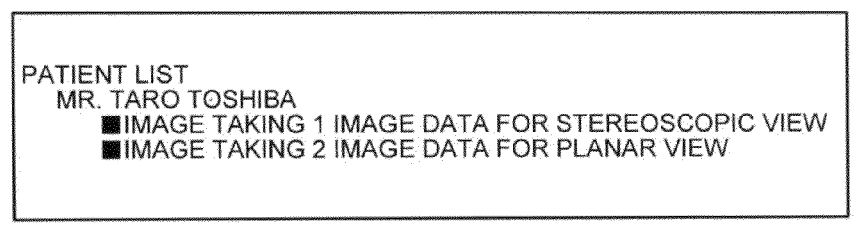
FIGS. 10A and 10B are drawings for explaining examples of displays realized by the display unit according to the first embodiment.
Figure 10B:
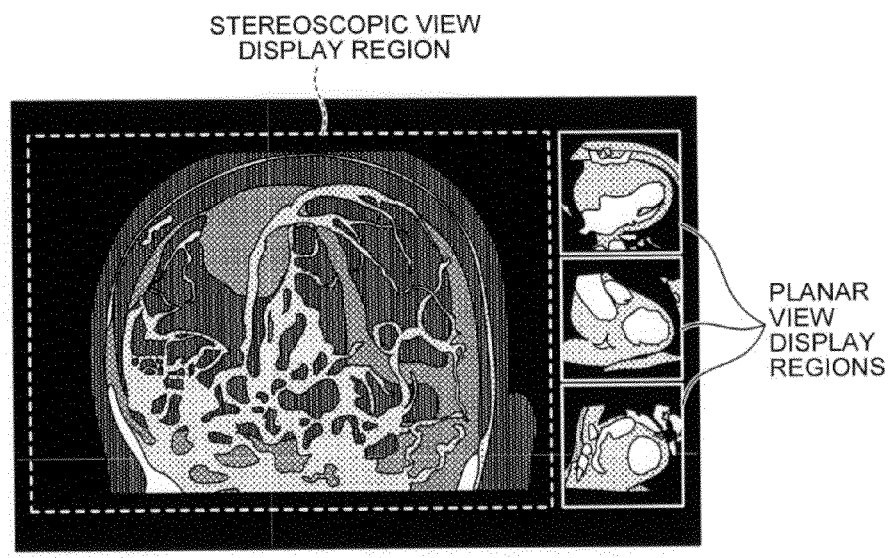

In this situation, the display unit 132 according to the first embodiment is also able to display both stereoscopic images and planar images on a single screen. FIGS. 10A and 10B are drawings for explaining examples of displays realized by the display unit 132 according to the first embodiment. For example, as shown in FIG. 10A, if a data set "patient list: Mr. Taro TOSHIBA, image taking 1: image data for a stereoscopic view; image taking 2: image data for a planar view" is appended as the display information, the display unit 132 displays, as shown in FIG. 10B, stereoscopic images and planar images in a display region for a stereoscopic view (hereinafter, "a stereoscopic view display region") and in a display region for a planar view (hereinafter, "a planar view display region"), respectively. In that situation, the switching control unit 1352 controls the switching unit 1321 so that no voltage is applied to the part of the electrode substrates corresponding to the stereoscopic view display region, and controls the switching unit 1321 so that a voltage is applied to the part of the electrode substrates corresponding to the planar view display region. Further, the display control unit 1353 causes the "image taking 1: image data for a stereoscopic view" to be displayed in the stereoscopic view display region and causes the "image taking 2: image data for a planar view" to be displayed in the planar view display region.

Figure 11:
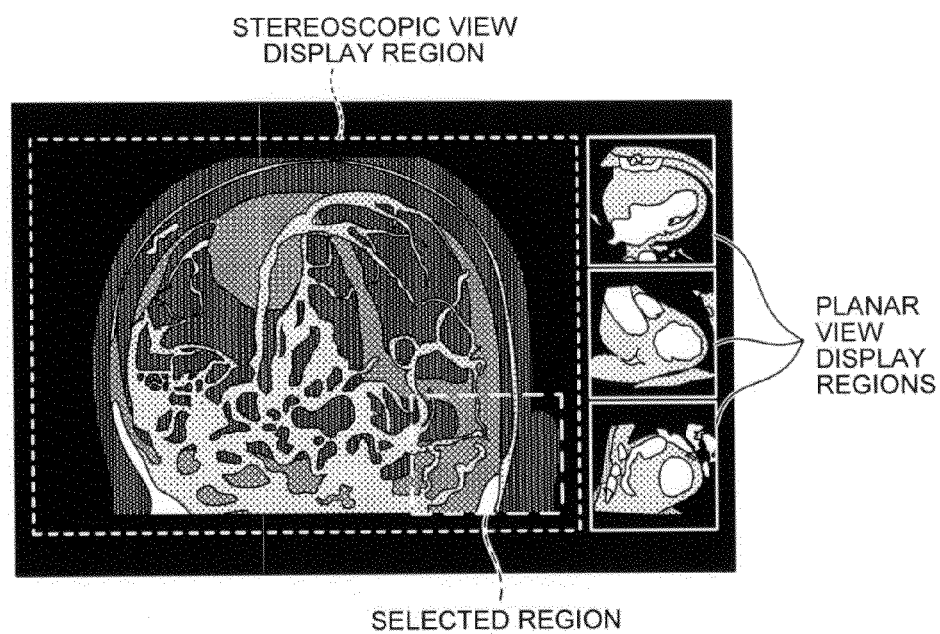
FIG. 11 is a drawing for explaining an example of a process performed by a selected region receiving unit according to the first embodiment.

Next, an example will be explained in which the display is switched between three-dimensional images and two-dimensional images according to a display method desired by the operator. Returning to the description of FIG. 7, the selected region receiving unit 1354 receives a setting of an arbitrary region in the images for a stereoscopic view or the images for a planar view displayed by the display unit 132. More specifically, the selected region receiving unit 1354 receives information related to the region set by the operator in the images for a stereoscopic view or the images for a planar view displayed by the display unit 132. FIG. 11 is a drawing for explaining an example of a process performed by the selected region receiving unit 1354 according to the first embodiment. For example, as shown in FIG. 11, the selected region receiving unit 1354 receives information related to a selected region set within the stereoscopic view display region. In an example, the selected region receiving unit 1354 receives, as the information related to the selected region, information about the part of the electrode substrates in the position corresponding to the selected region and coordinate information of the stereoscopic images displayed in the selected region. The setting of the selected region received by the selected region receiving unit 1354 is realized by using an arbitrary pointing device such as a mouse.

When the selected region receiving unit 1354 has received the information related to the selected region, the switching control unit 1352 exercises control as to whether a voltage should be applied to the part of the electrode substrates in the position corresponding to the selected region. For example, as shown in FIG. 11, if a selected region is set within the stereoscopic view display region, the switching control unit 1352 controls the switching unit 1321 so that a voltage is applied to the part of the electrode substrates in the position corresponding to the selected region.

Further, when the selected region receiving unit 1354 has received the information related to the selected region, the display control unit 1353 exercises control, based on the coordinate information of the stereoscopic images displayed in the selected region, so as to cause planar images in the position corresponding to the coordinates to be displayed. For example, the display control unit 1353 causes the planar images in the position corresponding to the coordinates of the stereoscopic images displayed in the selected region to be displayed in the selected region.

In this situation, when switching the selected region received by the selected region receiving unit 1354 to be a planar view display region, the switching control unit 1352 is able to change the size of the selected region. Further, the display control unit 1353 is also able to cause the images for a planar view to be displayed after changing the size thereof, according to the arbitrary size of the region changed by the switching control unit 1352. For example, the switching control unit 1352 controls the switching unit 1321 so as to apply a voltage to the part of the electrode substrates corresponding to a region larger than the selected region shown in FIG. 11 so that the region larger than the selected region is used as a display region and switched to be a planar view display region. After that, the display control unit 1353 enlarges the planar images so as to fit the display region switched to be the planar view display region by the switching control unit 1352 and causes the enlarged planar images to be displayed.

Even when the size of the selected region is not changed, the display control unit 1353 is also able to enlarge planar images and cause the enlarged planar images to be displayed. Further, the planar images to be displayed in the selected region may be cross-sectional images or MPR images that have already been reconstructed or may be images that are newly reconstructed after the selected region is set. Further, in the explanation above, the example is explained in which the selected region is set in the stereoscopic view display region so that the planar images are displayed therein; however, the disclosed techniques are not limited to this example. Another example is also acceptable in which a selected region is set in a planar view display region, so that stereoscopic images are displayed therein.

Figure 12:
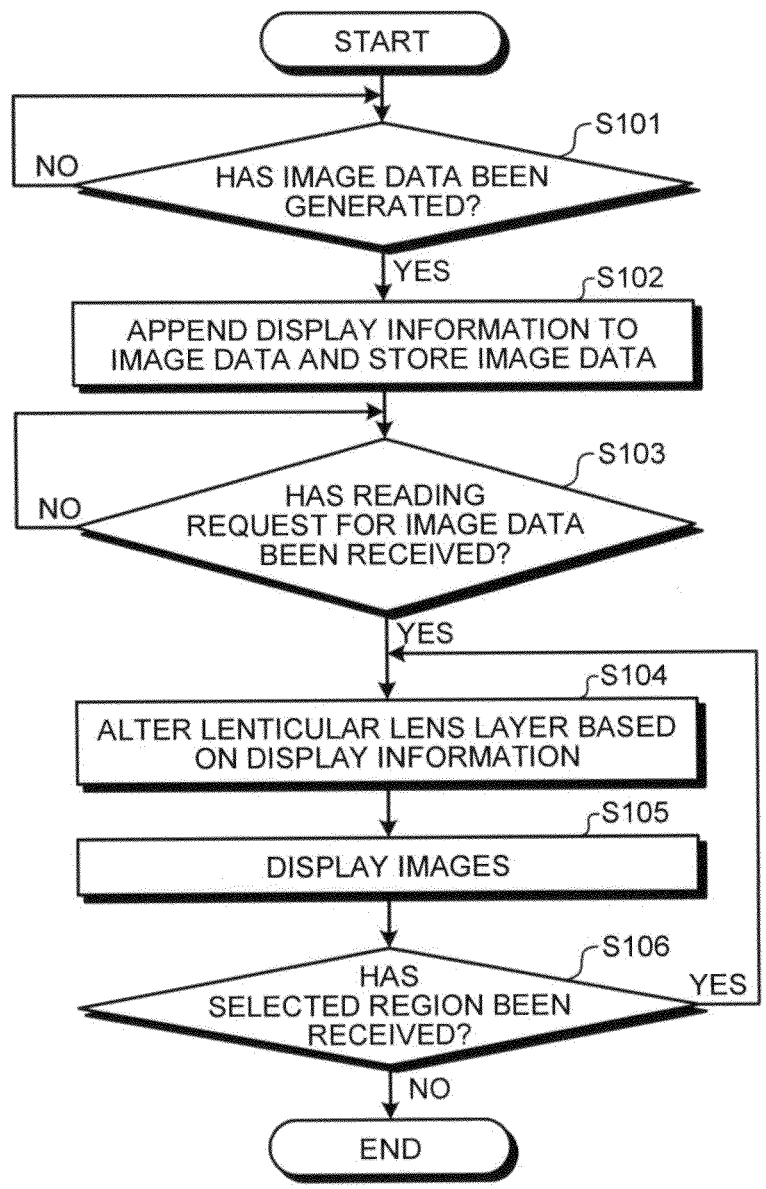
FIG. 12 is a flowchart of a procedure in a process performed by the workstation according to the first embodiment.

Next, a process performed by the workstation 130 according to the first embodiment will be explained, with reference to FIG. 12. FIG. 12 is a flowchart of a procedure in the process performed by the workstation 130 according to the first embodiment. As shown in FIG. 12, in the workstation 130 according to the first embodiment, when image data has been generated by the rendering processing unit 136 (step S101: Yes), the display information appending unit 1351 appends display information to the generated image data and stores the image data into the storage unit 134 (step S102).

After that, when an image data reading request is received (step S103: Yes), the switching control unit 1352 alters the lenticular lens layer based on the display information appended to the image data for which the reading request was received (step S104). More specifically, if the display information appended to the image data indicates that the image data is for a stereoscopic view, the switching control unit 1352 controls the switching unit 1321 so as to alter the lenticular lens layer to be in a lens shape. In contrast, if the display information appended to the image data indicates that the image data is for a planar view, the switching control unit 1352 controls the switching unit 1321 so as to alter the lenticular lens layer to be in a flat shape.

Subsequently, the display control unit 1353 causes the display unit 132 to display the images for which the reading request was received (step S105). After that, if a selected region is received by the selected region receiving unit 1354 (step S106: Yes), the process returns to step S104 where the switching control unit 1352 controls the switching unit 1321 so as to alter the lenticular lens layer, based on the display information of the image data that is currently displayed by the display unit 132. On the contrary, if no selected region is received (step S106: No), the workstation 130 ends the process.

As explained above, according to the first embodiment, the switching control unit 1352 judges whether the images to be displayed by the display unit 132 are images for a stereoscopic view or images for a planar view, based on the information about the images and exercises control so as to switch the display unit 132 into the stereoscopic view mode or the planar view mode according to the judgment result. Further, according to the control of the switching control unit 1352, the switching unit 1321 switches the display unit 132 into the stereoscopic view mode or the planar view mode. As a result, the workstation 130 according to the first embodiment makes it possible to display the three-dimensional images capable of providing the stereoscopic view and the two-dimensional images in a manner suitable for each of the different circumstances.

Further, according to the first embodiment, the display information appending unit 1351 appends the information for specifying that the images are for a stereoscopic view and the information for specifying that the images are for a planar view, to the volume data generated by the medical image diagnosis apparatus 110 and to the images for a stereoscopic view and the images for a planar view generated by the rendering processing unit 136. Further, based on the information appended by the display information appending unit, the switching control unit 1352 controls the switching unit 1321 so as to switch the display unit 132 into the stereoscopic view mode or the planar view mode. As a result, the workstation 130 according to the first embodiment is able to automatically switch between the display of the images for a stereoscopic view and the display of the images for a planar view and thus make it possible to display the three-dimensional images capable of providing the stereoscopic view and the two-dimensional images in a manner suitable for each of the different circumstances.

For example, when the workstation 130 according to the first embodiment is used, even if it is not known whether the clinical data which the operator wishes to have displayed is image data for a stereoscopic view or image data for a planar view, it is possible to automatically cause stereoscopic images or planar images to be displayed, by simply selecting the image data.

Also, according to the first embodiment, the selected region receiving unit 1354 receives the setting of an arbitrary region within the images for a stereoscopic view or the images for a planar view displayed by the display unit 132. Further, the switching control unit 1352 controls the switching unit 1321 so as to switch the display region corresponding to the arbitrary region received by the selected region receiving unit 1354 to be the stereoscopic view display region or to be the planar view display region, on the display unit 132. As a result, the workstation 130 according to the first embodiment makes it possible to display, in the region desired by the operator, the three-dimensional images capable of providing the stereoscopic view or the two-dimensional image.

Further, according to the first embodiment, when switching the display region corresponding to the arbitrary region received by the selected region receiving unit 1354 to be a planar view display region, the switching control unit 1352 changes the size of the arbitrary region. Also, the display control unit 1353 causes the images for a planar view to be displayed after changing the size thereof, according to the size of the arbitrary region changed by the switching control unit 1352. As a result, the workstation 130 according to the first embodiment is able to adjust the images that are displayed when the display is switched from the images for a stereoscopic view to the images for a planar view and thus makes it possible to display the images that are easy to see for the operator. For example, when planar images are simply displayed on a nine-parallax monitor, the size of each of the images is equal to one ninth of the screen, and the images are difficult to see. In contrast, even in such a situation, the workstation 130 according to the first embodiment is able to display the planar images that are optimal for the viewing.

Furthermore, according to the first embodiment, the display unit 132 includes the lenticular lens layer provided on the display surface for displaying the images for a stereoscopic view or the images for a planar view. Further, by increasing or decreasing the directionality of the light caused by the lenticular lens layer provided on the display surface of the display unit 132, the switching unit 1321 switches the display unit 132 into the stereoscopic view mode or the planar view mode. As a result, the workstation 130 according to the first embodiment is able to automatically switch between the display of the images for a stereoscopic view and the display of the images for a planar view by utilizing the existing technique and thus makes it possible to easily realize the displays of the three-dimensional images capable of providing the stereoscopic view and the two-dimensional images in a manner suitable for each of the different circumstances.

Second Embodiment

In a second embodiment, an example will be explained in which the operator performs various types of input processes via an operation screen that uses two-dimensional/three-dimensional icons, and the display unit 132 is switched into the stereoscopic view mode or the planar view mode accordingly.

Figure 13:
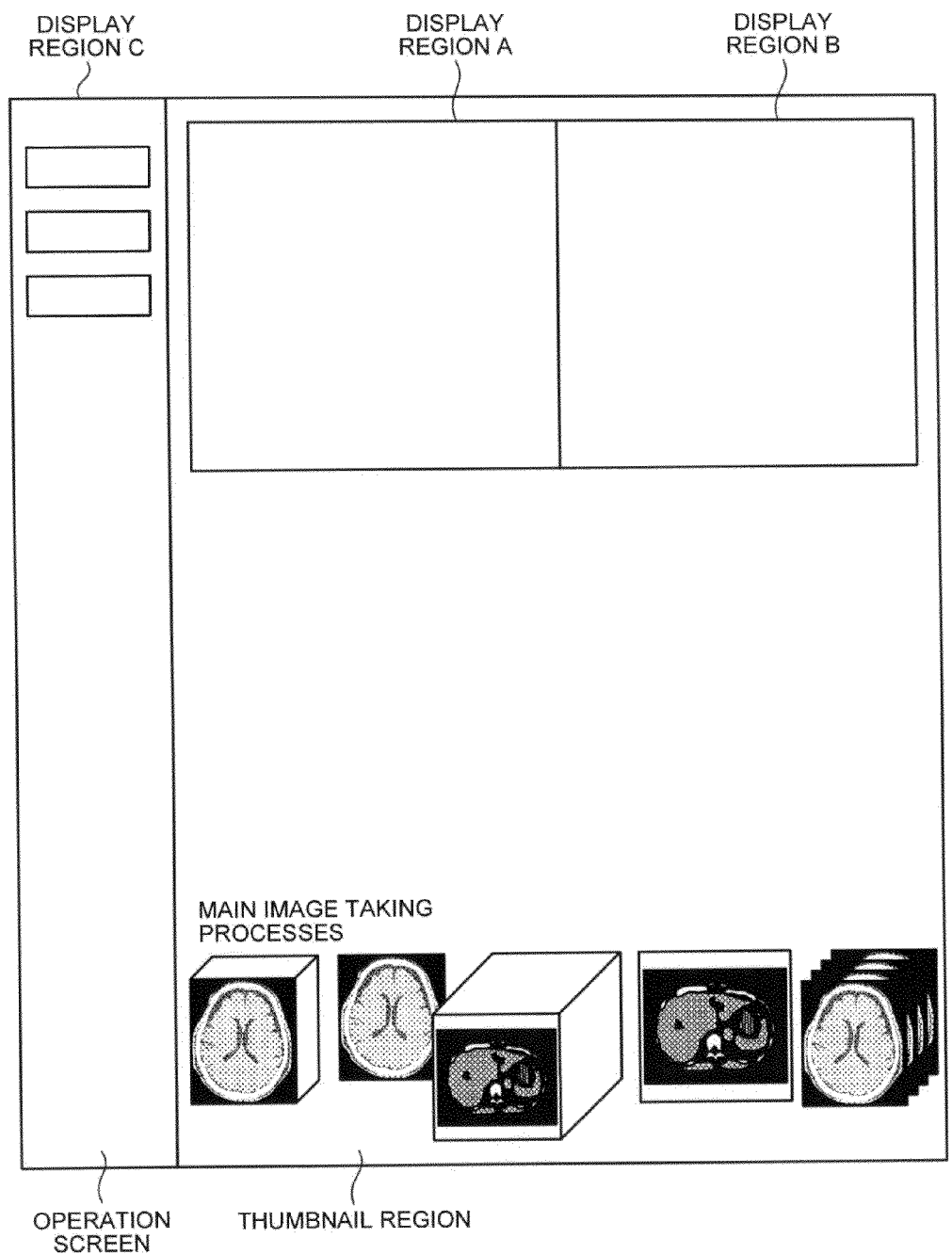
FIG. 13 is a drawing for explaining a first example of an operation screen displayed by a display unit according to a second embodiment.

FIG. 13 is a drawing for explaining a first example of an operation screen displayed by the display unit 132 according to the second embodiment. For example, as shown in FIG. 13, the display unit 132 displays an operation screen including a display region A, a display region B, a display region C, and a thumbnail region. In this situation, the five thumbnail icons shown in FIG. 13 are thumbnail icons for five types of medical image data stored in the storage unit 134. Each of the thumbnail icons shown in FIG. 13 indicates whether it is possible to display the corresponding medical image data as images that are capable of providing a stereoscopic view.

For example, of the thumbnail icons shown in FIG. 13, each of the thumbnail icons that are displayed three-dimensionally indicates that the corresponding medical image data stored in the storage unit 134 is volume data and that the volume data has appended thereto display information indicating that the images are images for a stereoscopic view. As another example, of the thumbnail icons shown in FIG. 13, the thumbnail icon displayed as a plurality of images overlapping one another indicates that the corresponding medical image data stored in the storage unit 134 represents a group of parallax images (e.g., nine-parallax images) and that the group of parallax images has appended thereto display information indicating that the images are images for a stereoscopic view. As yet another example, of the thumbnail icons shown in FIG. 13, each of the thumbnail icons that are displayed two-dimensionally indicates that the corresponding medical image data stored in the storage unit 134 represents two-dimensional images and that the two-dimensional images have appended thereto display information indicating that the images are images for a planar view.

Further, the display regions A to C shown in FIG. 13 are the regions in which the pieces of medical image data corresponding to the thumbnail icons selected by the operator from among the thumbnail icons displayed in the thumbnail region are to be displayed. For example, by performing a drag-and-drop operation to drag any of the five thumbnail images displayed in the thumbnail region into each of the display regions A to C while using a mouse, the operator is able to cause the corresponding images to be displayed in each of the display regions A to C.

In an example, when the operator performs a drag-and-drop operation to drag one of the thumbnail icons that are displayed three-dimensionally or the thumbnail icon depicting the plurality of images overlapping one another, into the display region A, the switching control unit 1352 switches the display region A to be a stereoscopic view display region, by controlling the switching unit 1321 so as not to apply a voltage to the part of the electrode substrates in the position corresponding to the display region A. In contrast, when the operator performs a drag-and-drop operation to drag one of the thumbnail icons that are displayed two-dimensionally into the display region B, the switching control unit 1352 switches the display region B to be a planar view display region, by controlling the switching unit 1321 so as to apply a voltage to the part of the electrode substrates in the position corresponding to the display region B.

Figure 14:
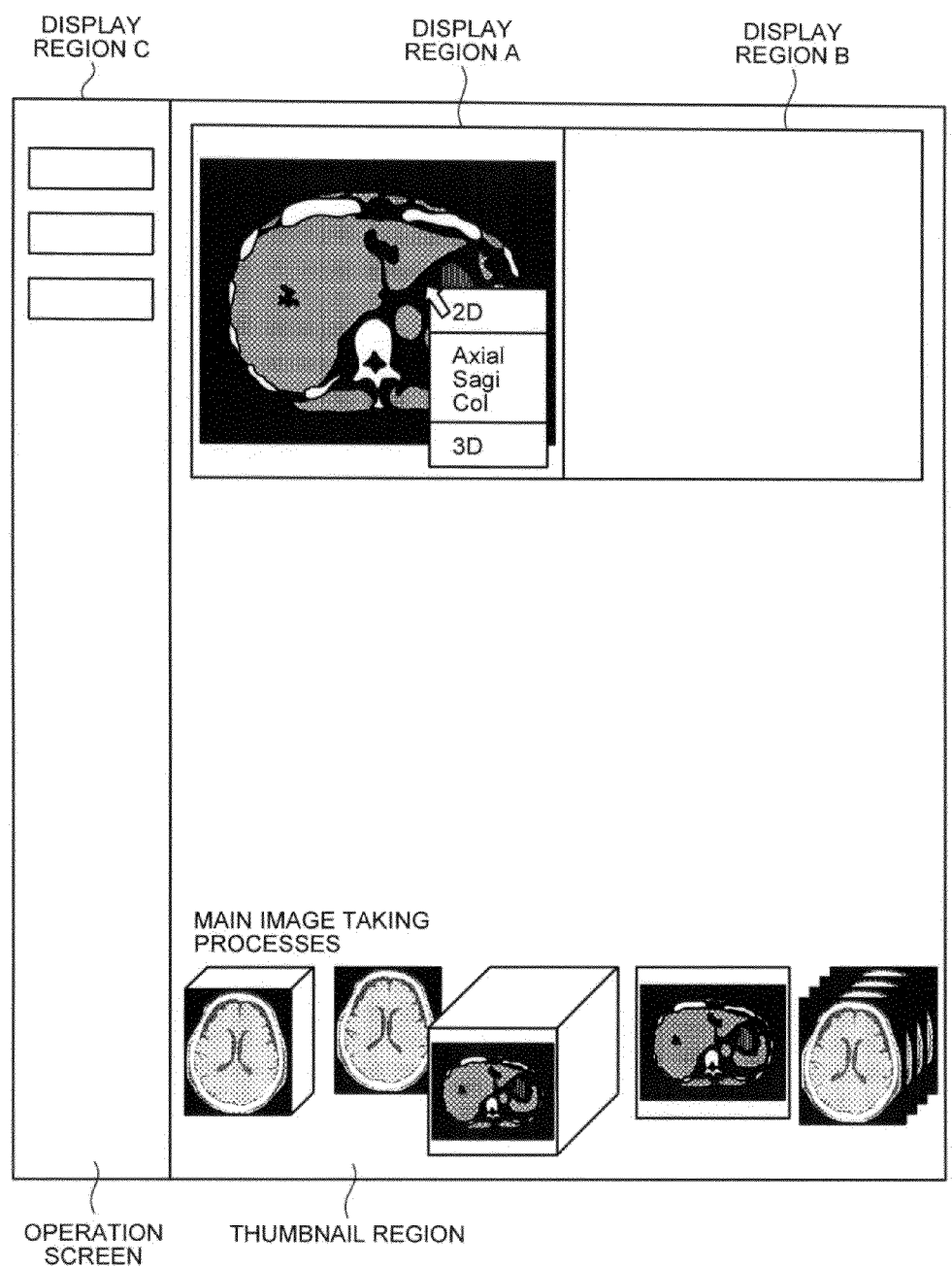
FIG. 14 is a drawing for explaining a second example of the operation screen displayed by the display unit according to the second embodiment.

Further, on the operation screen shown in FIG. 13, it is also possible to perform an operation to switch from the stereoscopic images displayed in the display region to planar images. FIG. 14 is a drawing for explaining a second example of the operation screen displayed by the display unit 132 according to the second embodiment. In this situation, FIG. 14 illustrates an operation that is performed after one of the thumbnail icons that are displayed three-dimensionally has been dragged and dropped into the display region A on the operation screen shown in FIG. 13.

For example, when the operator right-clicks on the stereoscopic images displayed in the display region A, the display control unit 1353 displays, as shown in FIG. 14, selectable items for "2D (two-dimensional)" including "Axial" "Sagi (sagittal)", and "Col (coronal)", as well as a selectable item "3D". The operator selects a desired item from among the selectable items displayed on the operation screen. For example, when the operator selects "Axial" under "2D", the rendering processing unit 136 reads the corresponding volume data from the storage unit 134 and generates two-dimensional images (e.g., MPR images) on an axial plane, from the read volume data.

At the same time, the switching control unit 1352 controls the switching unit 1321 so as to switch the display region A to be a planar view display region. Further, the display control unit 1353 causes the two-dimensional images generated by the rendering processing unit 136 to be displayed in the display region A that was switched to be a planar view display region. As described above, when the volume data is stored in the storage unit 134, the workstation 130 performs the re-rendering process to obtain high-definition two-dimensional images from the volume data and displays the obtained images.

In contrast, on the operation screen shown in FIG. 13, when the stereoscopic images that are displayed as a result of a drag-and-drop operation to drag the thumbnail icon depicting the plurality of images into the display region are switched to planar images, the display control unit 1353 causes the group of parallax images stored in the storage unit 134 to be displayed as two-dimensional images. For example, the display control unit 1353 causes one of the nine-parallax images stored in the storage unit 134 to be displayed by all of the nine pixels. Alternatively, the display control unit 1353 enlarges one of the nine-parallax images stored in the storage unit 134 to a size corresponding to nine pixels and divides the enlarged image into nine sections so as to cause the nine sections to be displayed by nine pixels, respectively. With each of these arrangements, it is possible to configure the planar images displayed in the display region to be high-definition images.

In this situation, when the operator right-clicks on the stereoscopic images that are displayed as a result of a drag-and-drop operation to drag the thumbnail icon depicting the plurality of images into the display region, only the cross-sectional plane of the group of parallax images stored in the storage unit 134 and the item "3D" are selectable. For example, among the selectable items shown in FIG. 14, only the item "Axial" under "2D" and the item "3D" are selectable. In one example, the display control unit 1353 displays the items "Axial" and "3D" in black text to indicate that these items are selectable and displays the items "Sagi" and "Col" in gray text to indicate that these items are unselectable.

When the operator right-clicks on the planar image that is displayed as a result of a drag-and-drop operation performed on a thumbnail icon displayed two-dimensionally, only the cross-sectional plane of the two-dimensional image stored in the storage unit 134 is selectable. For example, among the selectable items shown in FIG. 14, only the item "Axial" under "2D" is selectable. In other words, the display of the selectable item indicates that it is not possible to switch the displayed images to images on any other cross-sectional planes or to stereoscopic images.

Further, after stereoscopic images are switched to planar images as described above, it is also possible to put the planar images back to the stereoscopic images. In other words, when the operator right-clicks on the planar images, the selectable items are displayed again, so that when the operator selects the item "3D", it is possible to cause the stereoscopic images to be displayed again. In that situation, the switching control unit 1352 controls the switching unit 1321 so as to switch the display region to be a stereoscopic view display region.

Further, in the explanation above, the example is explained in which each of the display regions A to C is switched to be a stereoscopic view display region or a planar view display region, based on the medical image corresponding to the thumbnail icon on which the drag-and-drop operation was performed. However, it is also possible to set, in advance, each of the display regions A to C as a stereoscopic view display region or a planar view display region. For example, it is possible to set, in advance, the display region A shown in FIG. 13 as a stereoscopic view display region and to set the display region B shown in FIG. 13 as a planar view display region. In that situation, when one of the thumbnail icons displayed three-dimensionally or the thumbnail icon depicting the plurality of images is dragged and dropped into the display region B, which is a planar view display region, the display control unit 1353 causes the two-dimensional images for a planar view to be displayed in the display region B.

Figure 15:
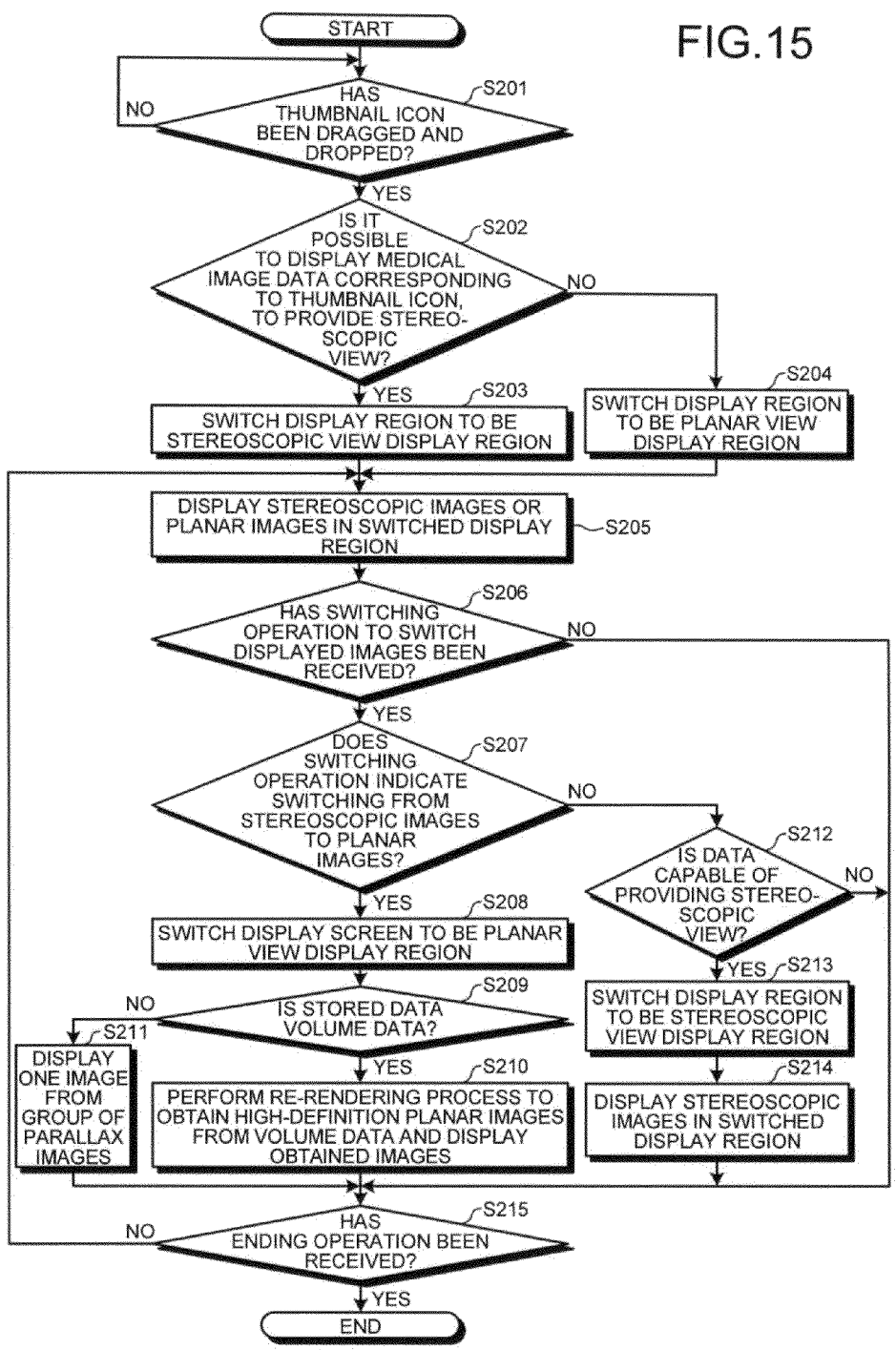
FIG. 15 is a flowchart of a procedure in a process performed by a workstation according to the second embodiment.

Next, a process performed by the workstation 130 according to the second embodiment will be explained, with reference to FIG. 15. FIG. 15 is a flowchart of a procedure in the process performed by the workstation 130 according to the second embodiment. FIG. 15 illustrates a process that is performed after the thumbnail icons are displayed on the operation screen. As shown in FIG. 15, in the workstation 130 according to the second embodiment, when a drag-and-drop operation is performed on one of the thumbnail icons (step S201: Yes), the switching control unit 1352 judges whether it is possible to display the medical image data corresponding to the thumbnail icon in such a manner that provides a stereoscopic view (step S202).

In this situation, if it is possible to display the medical image data corresponding to the thumbnail icon in such a manner that provides a stereoscopic view (step S202: Yes), the switching control unit 1352 controls the switching unit 1321 so as to switch the display region to be a stereoscopic view display region (step S203). On the contrary, if it is not possible to display the medical image data corresponding to the thumbnail icon in such a manner that provides a stereoscopic view (step S202: No), the switching control unit 1352 controls the switching unit 1321 so as to switch the display region to be a planar view display region (step S204).

After that, the display control unit 1353 causes stereoscopic images or planar images to be displayed in the display region that was switched by the switching unit 1321 (step S205). Subsequently, the switching control unit 1352 judges whether a switching operation to switch the displayed images has been received via the operation screen (step S206). In this situation, if a switching operation to switch the displayed images has been received (step S206: Yes), the switching control unit 1352 judges whether the switching operation is to switch from stereoscopic images to planar images (step S207).

In this situation, if the switching operation is to switch from stereoscopic images to planar images (step S207: Yes), the switching control unit 1352 controls the switching unit 1321 so as to switch the display screen to be a planar view display screen (step S208). After that, the display control unit 1353 judges whether the data stored in the storage unit 134 is volume data (step S209).

In this situation, if the stored data is volume data (step S209: Yes), the rendering processing unit 136 performs a re-rendering process to obtain high-definition two-dimensional images on the selected cross-sectional plane from the volume data, and the display control unit 1353 causes the planar images resulting from the re-rendering process to be displayed in the display region that was switched to be a planar view display region (step S210). On the contrary, if the stored data is not volume data (step S209: No), the display control unit 1353 causes one image from the group of parallax images to be displayed in the display region that was switched to be a planar view display region (step S211). For example, the display control unit 1353 causes the one image from the group of parallax images to be displayed by all of the nine pixels or enlarges the one image from the group of parallax images to a size corresponding to nine pixels, divides the enlarged image into nine sections, and causes the nine image sections to be displayed by the nine pixels, respectively.

On the contrary, at step S207, if the switching operation is not to switch from stereoscopic images to planar images (step S207: No), the switching control unit 1352 judges whether the data for planar images for which the switching operation was received is such data that is capable of providing a stereoscopic view (step S212). In this situation, if the image data is such data that is capable of providing a stereoscopic view (step S212: Yes), the switching control unit 1352 controls the switching unit 1321 so as to switch the display region to be a stereoscopic view display region (step S213). After that, the display control unit 1353 causes stereoscopic images to be displayed in the display region that was switched to be a stereoscopic view display region by the switching unit 1321 (step S214).

If no switching operation to switch the displayed images was received (step S206: No), or if the data is not such data that is capable of providing a stereoscopic view when planar images are switched to stereoscopic images (step S212: No), or after the planar images or the stereoscopic images are displayed (step S210, step S211, and step S214), the display control unit 1353 judges whether an ending operation to end the display of the images has been received (step S215).

In this situation, if no ending operation has been received (step S215: No), the process returns to step S205 where the display control unit 1353 keeps causing the stereoscopic images or the planar images to be displayed in the display region. On the contrary, if an ending operation has been received (step S215: Yes), the workstation 130 according to the second embodiment ends the process.

As explained above, according to the second embodiment, the display control unit 1353 causes the display unit 132 to display the operation screen including the display regions for displaying the images and the thumbnail icons each of which corresponds to a different one of the images with which the information appended by the display information appending unit 1351 is indicated. Further, when the images to be displayed in the display regions are selected by using the thumbnail icons, the switching control unit 1352 exercises control so as to switch each of the display regions to be the stereoscopic view display region or the planar view display region, based on the information appended to each of the selected images. As a result, the workstation 130 according to the second embodiment makes it possible to provide the operation screen that is easy to use for the operator.

Further, according to the second embodiment, on the operation screen, the switching control unit 1352 receives the switching operation to switch from the images for a stereoscopic view displayed in the display region to the images for a planar view and the switching operation to switch from the images for a planar view displayed in the display region to the images for a stereoscopic view and exercises control so as to switch the display region to be the planar view display region or the stereoscopic view display region according to the received operation. Further, if the operation received by the switching control unit 1352 is a switching operation to switch from the images for a stereoscopic view to the images for a planar view, the rendering processing unit 136 and the display control unit 1353 generate the high-definition images for a planar view. After that, the display control unit 1353 causes the generated images to be displayed in the display region. As a result, the workstation 130 according to the second embodiment makes it possible to provide the planar images that are easy to see for the operator.

Third Embodiment

The first and the second embodiments have thus been explained. The disclosed techniques may be implemented in other various forms besides the first and the second embodiments.

In the exemplary embodiments described above, the examples are explained in which the information is appended to the image data, so that the display unit 132 is switched into the planar view mode or the stereoscopic view mode based on the appended information. However, the disclosed techniques are not limited to these examples. For example, the display unit 132 may be switched into the planar view mode or the stereoscopic view mode, based on existing information appended to the image data. For example, the display unit 132 may be switched into the planar view mode or the stereoscopic view mode based on the accompanying information in a tag used in the DICOM system. In one example, when accompanying information indicates that the image data is volume data, the switching unit 1321 switches the display unit 132 into the stereoscopic view mode.

In the exemplary embodiments described above, the examples are explained in which the workstation 130 generates the stereoscopic images and the planar images from the volume data and displays the generated images. However, the disclosed techniques are not limited to these examples. For example, the medical image diagnosis apparatus 110 may generate the stereoscopic images and the planar images from the volume data and display the generated images. As another example, the medical image diagnosis apparatus 110 or the workstation 130 may generate the stereoscopic images and the planar images from the volume data, and the terminal apparatus 140 may display the generated images. In that situation, the image data is stored into the image storing apparatus 120 after the display information is appended thereto by the medical image diagnosis apparatus 110 or the workstation 130, so that the terminal apparatus 140 displays the stereoscopic images or the planar images, based on the display information appended to the image data read from the image storing apparatus 120.

In the exemplary embodiments described above, the terminal apparatus 140 is explained as an apparatus configured to, for example, display the medical images and the like obtained from the image storing apparatus 120. However, the disclosed techniques are not limited to this example. For example, the terminal apparatus 140 may be directly connected to the medical image diagnosis apparatus 110 or to the workstation 130.

Further, in the exemplary embodiments described above, the examples are explained in which the workstation 130 obtains the volume data from the image storing apparatus 120 and generates the stereoscopic images and the planar images from the obtained volume data. However, the disclosed techniques are not limited to these examples. For example, the workstation 130 may obtain the volume data from the medical image diagnosis apparatus 110 and generate the stereoscopic images and the planar images from the obtained volume data.

Further, in the exemplary embodiments described above, the examples are explained in which the display unit 132 is switched into the stereoscopic view mode or the planar view mode, by changing the polarization direction of the light output from the pixels by using the liquid crystal material. However, the disclosed techniques are not limited to these examples. The display unit 132 may be switched into the stereoscopic view mode or the planar view mode by using other arbitrary methods. In the following sections, an example will be explained in which the display unit 132 is switched into the stereoscopic view mode or the planar view mode by using a method different from the one explained in the first embodiment.

Figure 16:
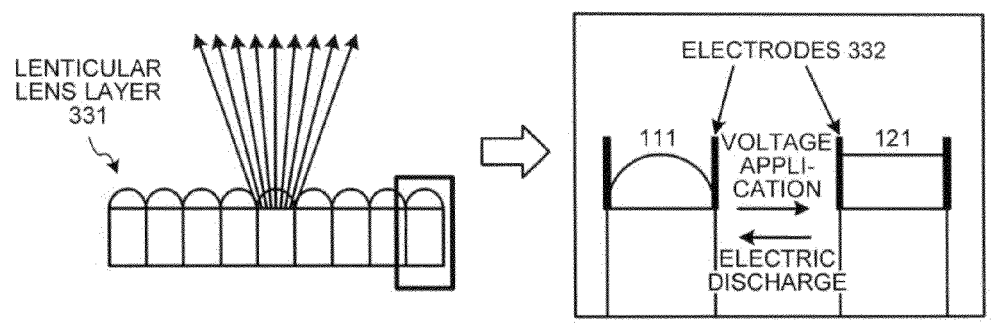
FIG. 16 is a drawing for explaining an exemplary configuration of a switching unit according to a third embodiment.

FIG. 16 is a drawing for explaining an exemplary configuration of the switching unit 1321 according to a third embodiment. For example, in the switching unit 1321 according to the third embodiment, a lenticular lens layer 331 is formed in such a manner that, as shown in FIG. 16, each of a plurality of cells having liquid of a certain refractive index enclosed is interposed between electrodes 332, to increase or decrease the directionality of the light caused by the lenticular lens layer. Further, if the display information appended to the image data serving as a display target indicates that the image data is for a planar view, the switching unit 1321 applies a voltage to the electrodes 332 so as to alter the shape of the lenticular lens layer from a lens shape 111 to a flat shape 112, as shown in FIG. 16, under the control of the switching control unit 1352. In other words, the switching unit 1321 switches the display unit 132 into the planar view mode in which the directionality of the light is decreased. On the contrary, if the display information appended to the image data serving as a display target indicates that the image data is for a stereoscopic view, the switching unit 1321 performs an electric discharging process on the electrodes 332 so as to alter the shape of the lenticular lens layer from the flat shape 112 to the lens shape 111, as shown in FIG. 16, under the control of the switching control unit 1352. In other words, the switching unit 1321 switches the display unit 132 into the stereoscopic view mode in which the directionality of the light is increased.

Further, in the exemplary embodiments described above, the examples are explained in which the display unit 132 is switched into the stereoscopic view mode and the planar view mode, by performing the voltage applying process and the electric discharging process on the electrodes between which the lenticular lenses are interposed. However, the disclosed techniques are not limited to these examples. For example, the display unit 132 may be switched into the stereoscopic view mode and the planar view mode by putting a filter over the lenticular lenses, the filter having the same refractive index as those of the lenticular lenses and having the shape opposite to the lens shape.

Further, in the exemplary embodiments described above, the examples are explained in which the liquid crystals are used to exercise control for the switching into the planar view mode or the stereoscopic view mode. However, the disclosed techniques are not limited to these examples. For example, as long as it is possible to electronically change the direction of the nano-level linear structure, it is acceptable to use any means.

Further, in the exemplary embodiments described above, the examples are explained in which the display unit 132 is switched into the stereoscopic view mode or the planar view mode, according to the information about the images (i.e., the information related to the reconstruction of the images). However, the embodiments are not limited to these examples. For example, the display unit 132 may be switched into the stereoscopic view mode or the planar view mode, based on information about the details of the medical examination. In one example, when the medical examination is an examination of the brain (e.g., an examination for a brain tumor or a subarachnoid hemorrhage) using an X-ray CT apparatus, the image display system switches the display unit 132 into the stereoscopic view mode, whereas when the medical examination is an X-ray examination of the chest using an X-ray diagnosis apparatus, the image display system switches the display unit 132 into the planar view mode. In that situation, for example, based on the accompanying information of the images or based on examination information input by the operator, the switching control unit 1352 judges whether the display unit 132 should be switched into the stereoscopic view mode or the planar view mode and switches the display unit 132 accordingly.

In another example, it is also possible for the image display system to switch the display unit 132 into the stereoscopic view mode or the planar view mode, based on information about the viewers. In one example, the image display system switches the display unit 132 into the stereoscopic view mode or the planar view mode, according to the number of viewers or for each specific viewer. For example, when the display unit 132 is switched according to the number of viewers, the image display system further includes a head tracking apparatus having a camera and exercises control so as to capture an image in front of the display surface of the display unit 132 by using the camera. Further, the image display system identifies the faces of the viewers by performing a pattern matching process to recognize the faces in the image captured by the camera and detects the number of viewers. For example, a viewer detecting unit 1351 detects the number of regions recognized as the faces in the pattern matching process, as the number of viewers.

After that, the image display system switches the display unit 132 into the stereoscopic view mode or the planar view mode according to the detected number of viewers. For example, the image display system switches the display unit 132 into the stereoscopic view mode if the number of viewers is one, whereas the image display system switches the display unit 132 into the planar view mode if the number of viewers is two or more. The opposite arrangement is also acceptable in which the image display system switches the display unit 132 into the stereoscopic view mode if the number of viewers is two or more, whereas the image display system switches the display unit 132 into the planar view mode if the number of viewers is one.

In the example where the display unit 132 is switched for each specific viewer, the image display system stores therein a desired display mode (the stereoscopic view mode or the planar view mode) in correspondence with each of different viewers, in addition to having the head tracking apparatus described above. Further, the image display system identifies each person by recognizing the face in the picture captured by the camera. Furthermore, the image display system reads the display mode corresponding to the identified person and switches the display unit 132 into the stereoscopic view mode or the planar view mode, based on the read display mode.

The control exercised over the head tracking apparatus described above and the processes (e.g., the process to detect the number of viewers and the process to identify the persons) performed on the images captured by the camera are realized by the switching control unit 1352. However, the control and the processes may be realized by the control unit 135 or may be realized by an additional functional unit (e.g., a detecting unit). Further, although the head tracking apparatus obtains the information about the viewers (the number of viewers and each specific person) in the example described above, the exemplary embodiments are not limited to this example. As long as it is possible to obtain the information about the viewers that are present in front of the display unit 132, it is possible to apply any other means.

According to the exemplary embodiments, the system, the apparatus, and the method for image display and the medical image diagnosis apparatus according to an aspect of the embodiments make it possible to display the three-dimensional images capable of providing a stereoscopic view and the two-dimensional images in a manner suitable for each of the different circumstances.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image display system including a controlling apparatus configured to control displays of medical images and a display apparatus configured to display at least one medical image in each of a plurality of regions on a single screen under the control of the controlling apparatus, wherein the controlling apparatus comprises:

a judging unit configured to, based on information related to medical images to be displayed in the plurality of regions on the display apparatus, judge whether each of the medical images is a medical image for a stereoscopic view or a medical image for a planar view;

a switching control unit configured to exercise control so as to switch each of the plurality of regions on the display apparatus into a stereoscopic view mode or a planar view mode, according to a judgment result of the judging unit;

a receiving unit configured to receive a setting of an arbitrary region in the medical image for the stereoscopic view or the medical image for the planar view displayed by the display apparatus; and a display control unit configured to cause a medical image for a stereoscopic view or a medical image for a planar view to be displayed in the arbitrary region that was switched to be the region for the stereoscopic view or the region for the planar view by the control of the switching control unit, whereas the display apparatus comprises:

a switching unit configured to switch each of the plurality of regions on the display apparatus into the stereoscopic view mode or the planar view mode, according to the control of the switching control unit, wherein the switching control unit exercises control so as to switch the arbitrary region received by the receiving unit to be a region for the stereoscopic view or a region for the planar view, the switching control unit changes a size of the arbitrary region, when exercising control so as to switch the arbitrary region received by the receiving unit to be the region for the planar view, and the display control unit displays the image for the planar view after changing a size thereof, according to the size of the arbitrary region changed by the switching control unit.

2. The image display system according to claim 1, wherein the controlling apparatus further comprises:

an image generating unit configured to generate the medical image for the stereoscopic view and the medical image for the planar view; and an information appending unit configured to append information for specifying that the image is for a stereoscopic view and information for specifying that the image is for a planar view, to the medical image for the stereoscopic view and to the medical image for the planar view generated by the image generating unit, respectively, and the switching control unit exercises control so as to switch each of the plurality of regions on the display apparatus into the stereoscopic view mode or the planar view mode, based on the information appended by the information appending unit.

3. The image display system according to claim 1, wherein the display apparatus includes a lenticular lens layer provided on a display surface used for displaying the medical image for the stereoscopic view or the medical image for the planar view, and the switching unit switches the display apparatus into the stereoscopic view mode or the planar view mode by increasing or decreasing directionality of light caused by the lenticular lens layer provided on the display surface.

4. The image display system according to claim 2, wherein the display control unit causes the display apparatus to display an operation screen including a display region for displaying one or more of the medical images and thumbnail icons respectively correspond to the medical images to each of which the information was appended by the information appending unit, and when one of the medical images to be displayed in the display region is selected by using one of the thumbnail icons, the switching control unit exercises control so as to switch the display region to be a display region for a stereoscopic view or a display region for a planar view, based on the information appended to the selected medical image.

5. The image display system according to claim 4, wherein the switching control unit receives, on the operation screen, a switching operation to switch from the medical image for the stereoscopic view displayed in the display region to the medical image for the planar view and a switching operation to switch from the medical image for the planar view displayed in the display region to the medical image for the stereoscopic view and exercises control so as to switch the display region to be the display region for the planar view or the display region for the stereoscopic view according to the received switching operation, if the switching operation received by the switching control unit is a switching operation to switch from the medical image for the stereoscopic view to the medical image for the planar view, the image generating unit generates a high-definition medical image for a planar view, and when the high-definition medical image for the planar view is generated by the image generating unit, the display control unit causes the generated high-definition medical image to be displayed in the display region.

6. An image display apparatus comprising:

a judging unit configured to, based on information relating to medical images to be displayed in the plurality of regions on the display apparatus, judge whether each of the medical images is a medical image for a stereoscopic view or a medical image for a planar view;

a switching control unit configured to exercise control so as to switch each of the plurality of regions on the display apparatus into a stereoscopic view mode or a planar view mode, according to a judgment result of the judging unit;

a switching unit configured to switch each of the plurality of regions on the display apparatus into the stereoscopic view mode or the planar view mode according to the control of the switching control unit;

a receiving unit configured to receive a setting of an arbitrary region in the medical image for the stereoscopic view or the medical image for the planar view displayed by the display apparatus; and a display control unit configured to cause a medical image for a stereoscopic view or a medical image for a planar view to be displayed in the arbitrary region that was switched to be the region for the stereoscopic view or the region for the planar view by the control of the switching control unit, wherein the switching control unit exercises control so as to switch the arbitrary region received by the receiving unit to be a region for the stereoscopic view or a region for the planar view, the switching control unit changes a size of the arbitrary region, when exercising control so as to switch the arbitrary region received by the receiving unit to be the region for the planar view, and the display control unit displays the image for the planar view after changing a size thereof, according to the size of the arbitrary region changed by the switching control unit.

7. An image display method implemented by an image display system including a controlling apparatus configured to control displays of medical images and a display apparatus configured to display at least one medical image in each of a plurality of regions on a single screen under the control of the controlling apparatus, the image display method comprising:

judging, by a judging unit of the controlling apparatus, based on information related to medical images to be displayed in the plurality of regions on the display apparatus, whether each of the medical images is a medical image for a stereoscopic view or a medical image for a planar view;

controlling, by a switching control unit of the controlling apparatus, to exercise control so as to switch each of the plurality of regions on the display apparatus into a stereoscopic view mode or a planar view mode, according to a result of the judging;

receiving, by a receiving unit of the controlling apparatus, a setting of an arbitrary region in the medical image for the stereoscopic view or the medical image for the planar view displayed by the display apparatus;

controlling, by a display control unit of the controlling apparatus, to cause a medical image for a stereoscopic view or a medical image for a planar view to be displayed in the arbitrary region that was switched to be the region for the stereoscopic view or the region for the planar view by the control of the switching control unit; and switching, by a switching unit of the display apparatus, each of the plurality of regions on the display apparatus into the stereoscopic view mode or the planar view mode according to the controlling by the switching control unit, wherein the switching control unit exercises control so as to switch the arbitrary region received by the receiving unit to be a region for the stereoscopic view or a region for the planar view, the switching control unit changes a size of the arbitrary region, when exercising control so as to switch the arbitrary region received by the receiving unit to be the region for the planar view, and the display control unit displays the image for the planar view after changing a size thereof, according to the size of the arbitrary region changed by the switching control unit.

8. A medical image diagnosis apparatus comprising:

a judging unit configured to, based on information relating to medical images to be displayed in the plurality of regions on the display apparatus, judge whether each of the medical images to be displayed by a display unit is a medical image for a stereoscopic view or a medical image for a planar view;

a switching control unit configured to exercise control so as to switch each of the plurality of regions on the display unit into a stereoscopic view mode or a planar view mode, according to a judgment result of the judging unit;

a switching unit configured to switch each of the plurality of regions on the display unit into the stereoscopic view mode or the planar view mode according to the control of the switching control unit;

a receiving unit configured to receive a setting of an arbitrary region in the medical image for the stereoscopic view or the medical image for the planar view displayed by the display apparatus; and a display control unit configured to cause a medical image for a stereoscopic view or a medical image for a planar view to be displayed in the arbitrary region that was switched to be the region for the stereoscopic view or the region for the planar view by the control of the switching control unit, wherein the switching control unit exercises control so as to switch the arbitrary region received by the receiving unit to be a region for the stereoscopic view or a region for the planar view, the switching control unit changes a size of the arbitrary region, when exercising control so as to switch the arbitrary region received by the receiving unit to be the region for the planar view, and the display control unit displays the image for the planar view after changing a size thereof, according to the size of the arbitrary region changed by the switching control unit.

* * * * *